(12) United States Patent
Naito et al.

(10) Patent No.: US 6,639,715 B2
(45) Date of Patent: Oct. 28, 2003

(54) RAMAN AMPLIFIER AND OPTICAL TRANSMISSION SYSTEM USING THE AMPLIFIER

(75) Inventors: Takao Naito, Kawasaki (JP); Toshiki Tanaka, Kawasaki (JP)

(73) Assignee: Fujitsu Limited, Kawasaki (JP)

(\*) Notice: Subject to any disclaimer, the term of this patent is extended or adjusted under 35 U.S.C. 154(b) by 0 days.

(21) Appl. No.: 09/935,575

(22) Filed: Aug. 24, 2001

(65) Prior Publication Data

US 2002/0105715 A1 Aug. 8, 2002

(30) Foreign Application Priority Data

Feb. 6, 2001 (JP) .................................. 2001-030053

(51) Int. Cl.$^7$ ................................................. H01S 3/00
(52) U.S. Cl. ..................................... 359/334; 359/341.3
(58) Field of Search ........................... 359/334, 341.3, 359/341.33

(56) References Cited

U.S. PATENT DOCUMENTS 6,292,288 B1 * 9/2001 Akasaka et al. ............ 359/334
6,424,455 B1 * 7/2002 Dmitri ........................ 359/334

FOREIGN PATENT DOCUMENTS

JP A-9-197452 7/1997
JP A-10-73852 3/1998

\* cited by examiner

Primary Examiner—Mark Hellner
(74) Attorney, Agent, or Firm—Staas & Halsey LLP

(57) ABSTRACT

A plurality of pump lights are appropriately located in a wavelength band $\lambda 1$ to $\lambda 3$. The width of the wavelength band $\lambda 1$ to $\lambda 3$ is wider than a Raman shift amount. Gain is obtained in a wavelength band $\lambda 2$ to $\lambda 3$ by the plurality of pump lights located in the wavelength band $\lambda 1$ to $\lambda 2$. Gain is obtained in a wavelength band $\lambda 3$ to $\lambda 4$ by the plurality of pump lights located in the wavelength band $\lambda 2$ to $\lambda 3$. As a result, gain can be obtained in a wavelength band $\lambda 2$ to $\lambda 4$. A plurality of signal lights are located in the wavelength band $\lambda 2$ to $\lambda 4$. The deviation of gain can be adjusted by controlling the power of each of the plurality of pump lights.

26 Claims, 32 Drawing Sheets

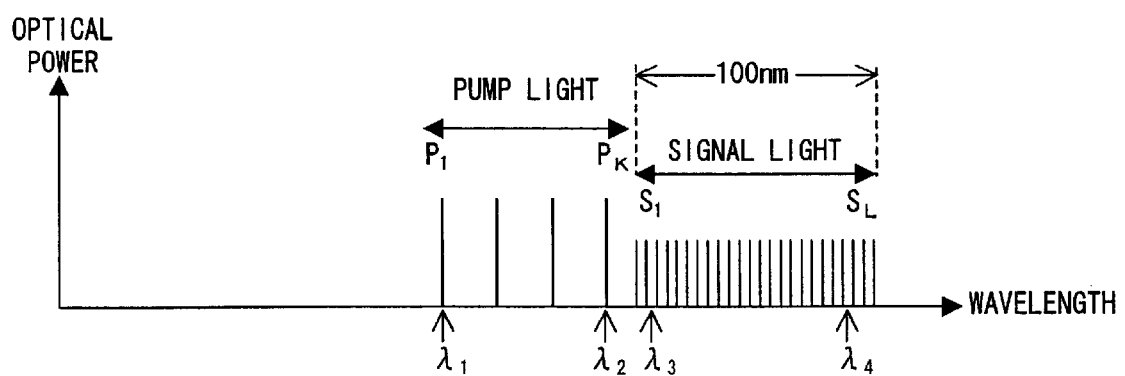
F I G. 4

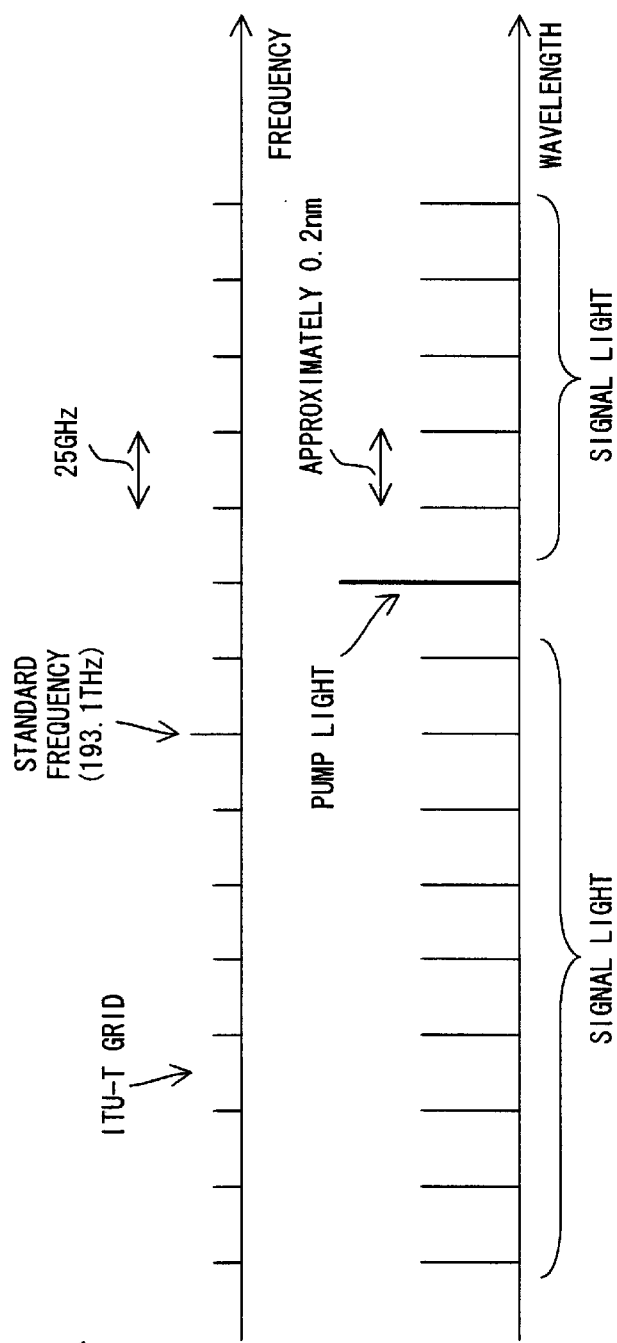
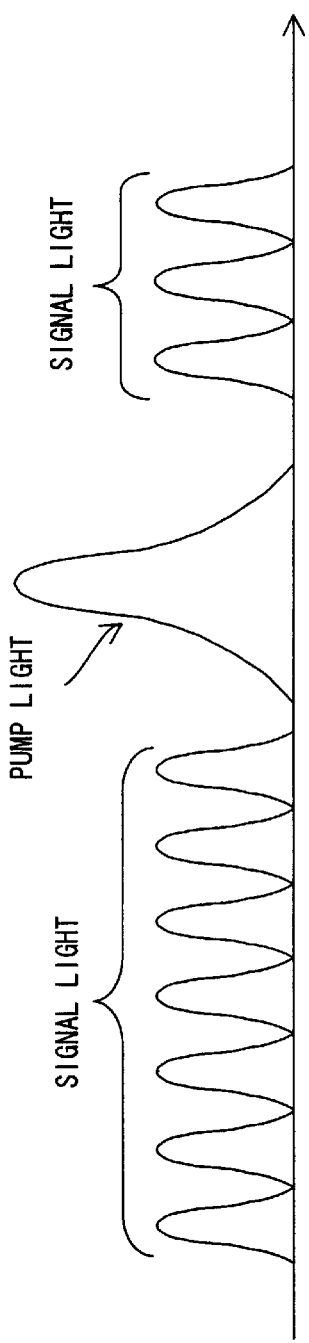
FIG. 11A
FIG. 11B

FIG. 29A

| n | Δf_E (THz) | WAVELENGTH INTERVAL @1550nm (nm) |
|---|---|---|
| 1 | 13.2 | 105.7 |
| 2 | 6.6 | 52.9 |
| 3 | 4.4 | 35.2 |
| 4 | 3.3 | 26.4 |
| 5 | 2.64 | 21.1 |
| 6 | 2.2 | 17.6 |

FIG. 29B

| n | Δf_E (THz) | WAVELENGTH INTERVAL @1550nm (nm) |
|---|---|---|
| 1 | 8.8 | 70.5 |
| 2 | 5.28 | 42.3 |
| 3 | 3.77 | 30.2 |
| 4 | 2.93 | 23.4 |
| 5 | 2.4 | 19.2 |
| 6 | 2.0 | 16.3 |

RAMAN AMPLIFIER AND OPTICAL TRANSMISSION SYSTEM USING THE AMPLIFIER

BACKGROUND OF THE INVENTION

1. Field of the Invention

The present invention relates to a Raman amplifier and an optical transmission system using the amplifier, and in particular, relates to a technology for extending the wavelength bandwidth used to transmit signal light.

2. Description of the Related Art

Conventionally, in a long-haul optical transmission system, at each relay device, signal light was once converted into an electrical signal for 3R-process (Re-timing, Re-shaping and Re-generating), then the electrical signal was converted back into signal light and the signal light is transmitted to a next relay device. However, an optical amplifier for amplifying optical signal without converting the signal into an electrical signal has been promoted and a transmission system using the optical amplifier as a linear relay device has been studied. By replacing a repeater that requires the optical/electrical conversion described above with an optical amplifier/repeater, it is expected that the number of parts composing each relay device is greatly reduced, reliability is improved and cost is reduced accordingly.

As the Internet and the like have been spread, the amount of information to be transmitted through a network has increased and a technology for improving the capacity of a transmission system has been actively studied. As one method for implementing the large capacity of a transmission system, WDM (wavelength division multiplex) optical transmission method is focused. In a WDM transmission system a plurality of signals are multiplexed and transmitted using a plurality of carrier waves with different wavelength, and an information amount to be transmitted through one piece of optical fiber can be greatly increased.

FIG. 1 shows the configuration of a general optical transmission system. In this system, multi-wavelength light is transmitted from an optical transmitter 100 to an optical receiver 200. Specifically, the optical transmitter 100 generates multi-wavelength light by multiplexing a plurality of signal lights with different wavelengths and transmits the multiplexed signals to a transmission line. The optical receiver 200 detects each signal by demultiplexing the received multi-wavelength light for each wavelength. The transmission line is made from an optical fiber and optical amplifiers are installed at predetermined intervals.

For each optical amplifier, usually an erbium-doped fiber amplifier (EDFA) is used. The gain wavelength band of a general EDFA is 1.55 μm and that of a GS-EDFA (Gain Shift EDFA) is 1.58 μm. Each of the bandwidth of the EDFAs is approximately 30 nm. Therefore, if an EDFA is provided in the transmission line of a WDM optical transmission system, a plurality sets of signal light are transmitted using carrier waves within this gain wavelength band.

To increase the capacity of a transmission system, it is effective to increase the number of wavelengths to be multiplexed. Lately, as an optical amplification method for a wider gain wavelength band compared with an EDFA, a Raman amplifier using Raman scattering is focused.

In Raman amplification, when a pump light is provided to an optical fiber, a gain is obtained at a wavelength which is longer than the wavelength of the pump light. For example, in a case of $GeO_2$-doped silica ($SiO_2$) optical fiber, in a 1.55 μm band, again is obtained at a wavelength which is longer by approximately 100 nm compared with the wavelength of pump light, as shown in FIG. 2A. This amount of shift is 13.2 Tera Hz, when converted into a frequency. A Raman amplifier can amplify an arbitrary wavelength if only a corresponding pump light can be prepared.

A Raman amplifier is implemented by using the above described nature. To obtain a wide gain wavelength band, a plurality of pump lights with different center frequencies are used, as shown in FIG. 2B. This method is recited, for example, in Y. Emori et al., "100 nm Bandwidth Flat Gain Raman Amplifiers Pumped and Gain-equalized by 12-wavelength Channel WDM High Power Laser Diodes", OFC'99 PD19, 1999. In this way, by using a plurality of pump lights, a wider gain wavelength band can be obtained.

FIG. 3 shows a configuration of a WDM optical transmission system using a Raman amplifier. A pump light for Raman amplification is basically supplied to a transmission line optical fiber so as to be transmitted in the opposite direction of signal light. In this case, if a plurality of pump lights are used, as shown in FIG. 2B, pump lights output from a plurality of light sources with different oscillation frequencies are supplied to a transmission line optical fiber by a wavelength coupler (wavelength multiplexer) or the like.

As described above, a Raman amplifier using Raman scattering obtains a gain in a wavelength band which is longer by approximately 100 nm than a wavelength of pump light in a 1.55 μm band. For example, as shown in FIG. 4, when a pump light P1 with wavelength λ1 is inputted, a gain is obtained in a wavelength band which is longer by approximately 100 nm than wavelength λ1 (around wavelength λ3). Similarly, when a pump light Pk with wavelength λ2 is inputted, a gain is obtained in a wavelength band which is longer by approximately 100 nm than wavelength λ2 (around wavelength λ4) Therefore, if a plurality of pump lights P1 through Pk are appropriately used, a gain bandwidth of appropriately 100 nm can be obtained. In this case, a plurality of signal lights S1 through SL are transmitted using this gain wavelength bandwidth of appropriately 100 nm.

However, in a conventional Raman amplifier, gain bandwidth is limited by the respective shift amounts from a wavelength of pump light to a wavelength of Raman gain obtained due to the pump light. Specifically, if the difference in wavelength between pump light and Raman gain obtained due to the pump light is 100 nm, the maximum gain bandwidth obtained by a Raman amplifier is also approximately 100 nm.

SUMMARY OF THE INVENTION

It is an object of the present invention to provide a Raman amplifier which obtains a wider gain bandwidth.

A Raman amplifier of the present invention amplifies multi-wavelength light including a plurality of signal lights, and comprises: a transmission medium for transmitting the multi-wavelength light and first pump light for amplifying the multi-wavelength light; a light source for generating second pump light for amplifying the multi-wavelength light; and an optical device for guiding the second pump light generated by the light source to the transmission medium, wherein at least one of the first pump light and second pump light is located within the band of the multi-wavelength light.

According to this Raman amplifier, if the first pump light is appropriately located within the band of the multi-wavelength light and the second pump light is appropriately located at a wavelength which is shorter than that the multi-wavelength light, the second pump light amplifies a part of the signal light and first pump light, and the amplified first pump light amplifies the other part of the signal light. Thus, Raman amplification with a wider band than a Raman shift amount can be realized.

A Raman amplifier in another feature of the present invention amplifies multi-wavelength light including a plurality of signal lights, and comprises: a transmission medium for transmitting the multi-wavelength light and auxiliary light with a longer wavelength than the wavelength of the multi-wavelength light, a light source for generating pump light for amplifying the multi-wavelength light, and an optical device for guiding the pump light generated by the light source to the transmission medium.

According to this Raman amplifier, the multi-wavelength light is amplified by the pump light. The auxiliary light absorbs a part of the energy of the amplified multi-wavelength light. Therefore, the multi-wavelength light can be avoided from being too strong.

An optical transmission system of the present invention has a configuration in which multi-wavelength light including a plurality of signal lights is amplified by a Raman amplifier, wherein the Raman amplifier amplifies the multi-wavelength light using a plurality of pump lights located at frequency intervals of 1/n of a Raman shift amount (n is an integer).

According to this transmission system, since a plurality of pump lights for Raman amplification are located at frequency intervals of 1/n of a Raman shift amount, the peak frequency of Raman gain due to particular pump light matches the frequency of corresponding pump light. Therefore, it is easy to adjust a power of each of the pump lights for equalizing Raman gain.

BRIEF DESCRIPTION OF THE DRAWINGS

FIG. 4 shows the amplification operation of a conventional Raman amplifier;

FIGS. 11A and 11B show how to set signal light and pump light;

FIGS. 29A and 29B are tables for determining the location of pump light;

DESCRIPTION OF THE PREFERRED EMBODIMENTS

Figure 1:
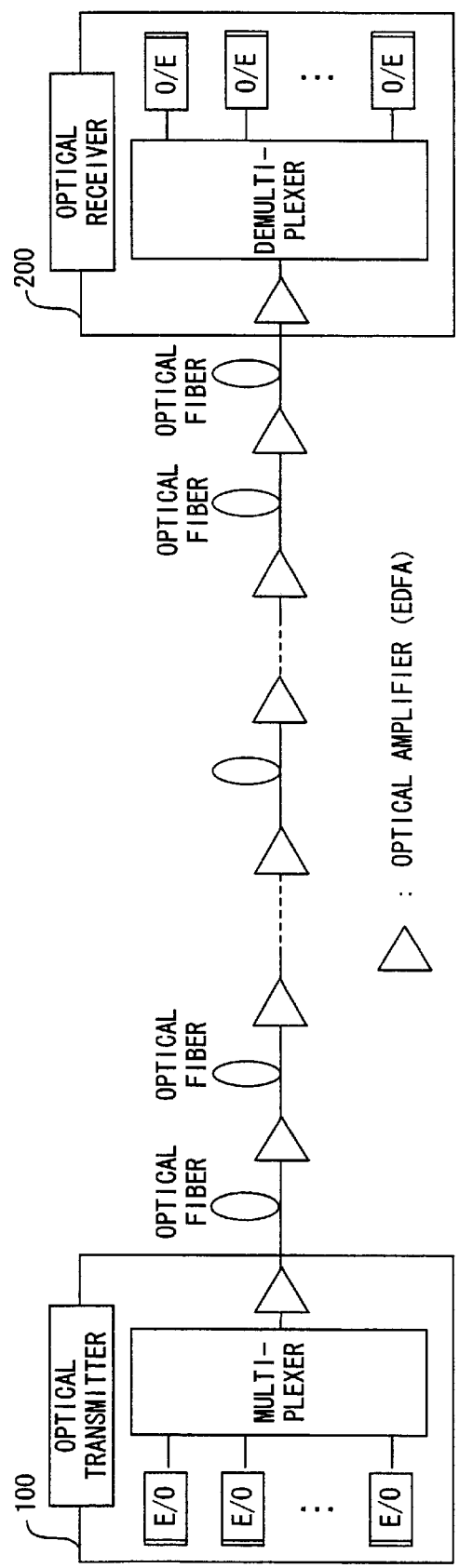
FIG. 1 shows a configuration of a general optical transmission system.
Figure 2A:
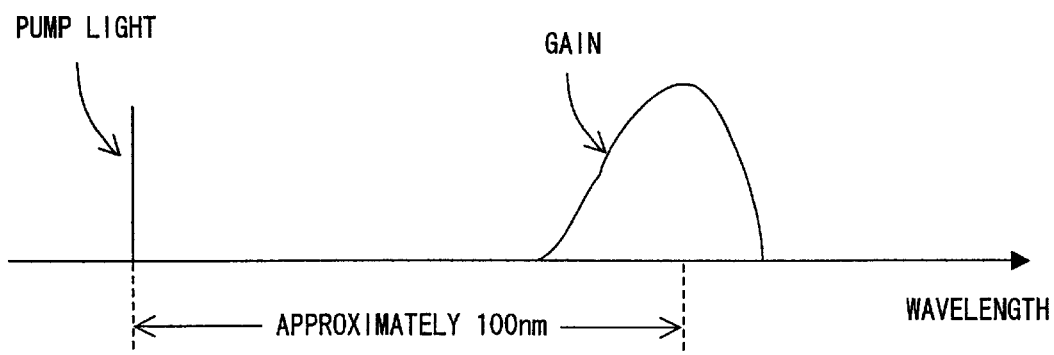
FIGS. 2A and 2B show a principle of Raman amplification.
Figure 2B:
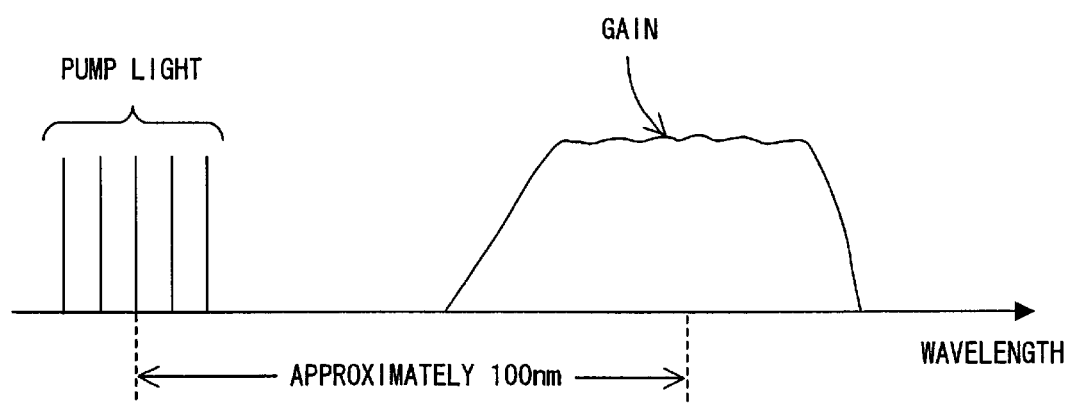
Figure 3:
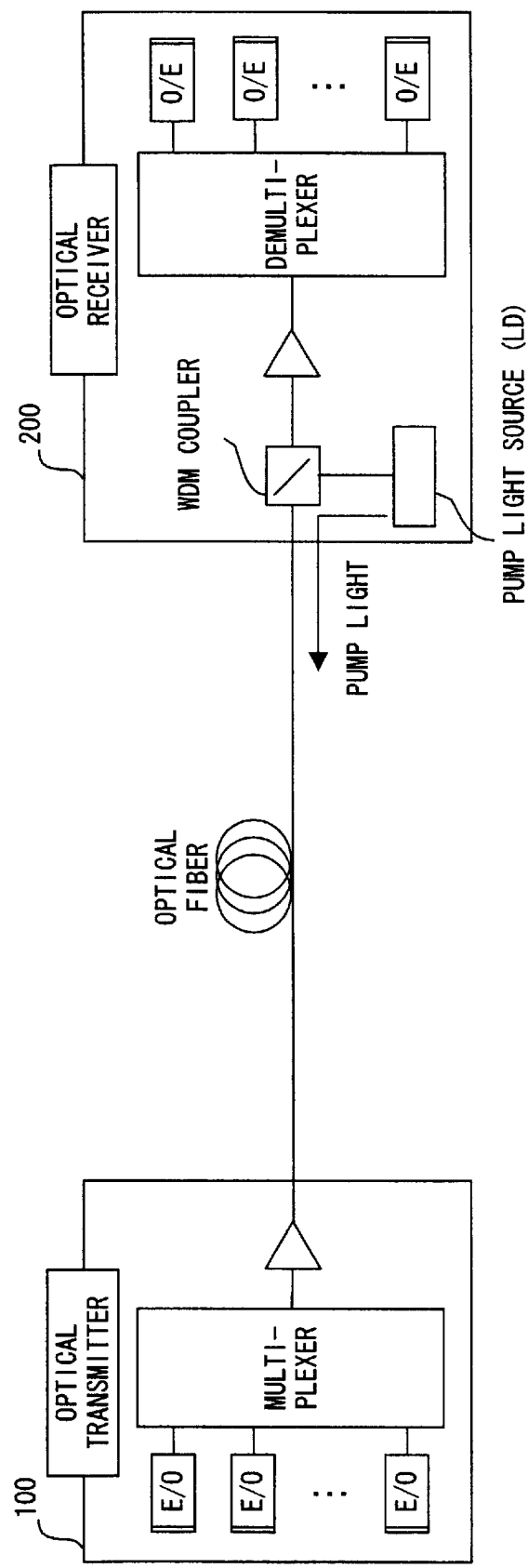
FIG. 3 shows the configuration of a WDM optical transmission system using Raman amplification.
Figure 5:
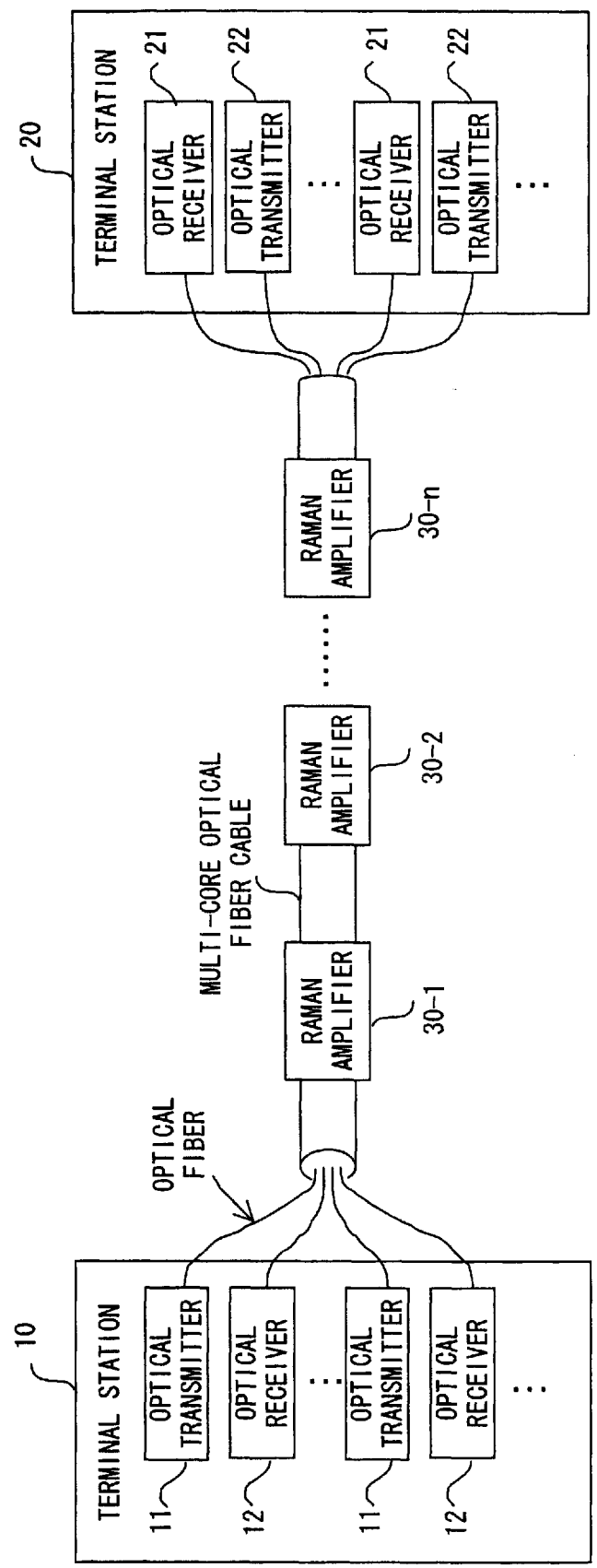
FIG. 5 shows the configuration of an optical transmission system provided with the Raman amplifier of the present invention.

FIG. 5 shows a configuration of an optical transmission system provided with a Raman amplifier of the present invention. This transmission system comprises terminal stations 10 and 20, and a multi-core optical fiber cable connects them. Signals are transmitted from the terminal station 10 to the terminal station 20 and vice versa.

The terminal station 10 comprises a plurality of optical transmitters 11 and a plurality of optical receivers 12. The terminal station 20 comprises a plurality of optical receivers 21 and a plurality of optical transmitters 22. Signals transmitted from each optical transmitter 11 are transmitted through an optical fiber and are received by a corresponding optical receiver 21. Signals transmitted from each transmitter 22 are transmitted through an optical fiber and are received by a corresponding optical receiver 12. Each of transmitters 11 and 22 transmits multi-wavelength light. That is to say, in this transmission system, the respective multi-wavelength light is transmitted through each optical fiber composing a multi-core optical fiber cable.

A transmission line between the terminal stations 10 and 20 is provided with a plurality of Raman amplifiers 30-1 through 30-n. Each of the Raman amplifiers 30-1 through 30-n amplifies multi-wavelength light transmitted through each optical fiber composing the multi-core optical fiber cable, respectively. In Raman amplification, when pump light is supplied to an optical fiber (optical transmission medium), the optical fiber itself operates as an optical amplifier. Therefore, a "Raman amplifier" comprises an optical fiber and a device for supplying pump light to the optical fiber. However, the device for supplying pump light to the optical fiber is sometimes called a "Raman amplifier". Each Raman amplifier can also be provided in an optical relay device.

Figure 6:
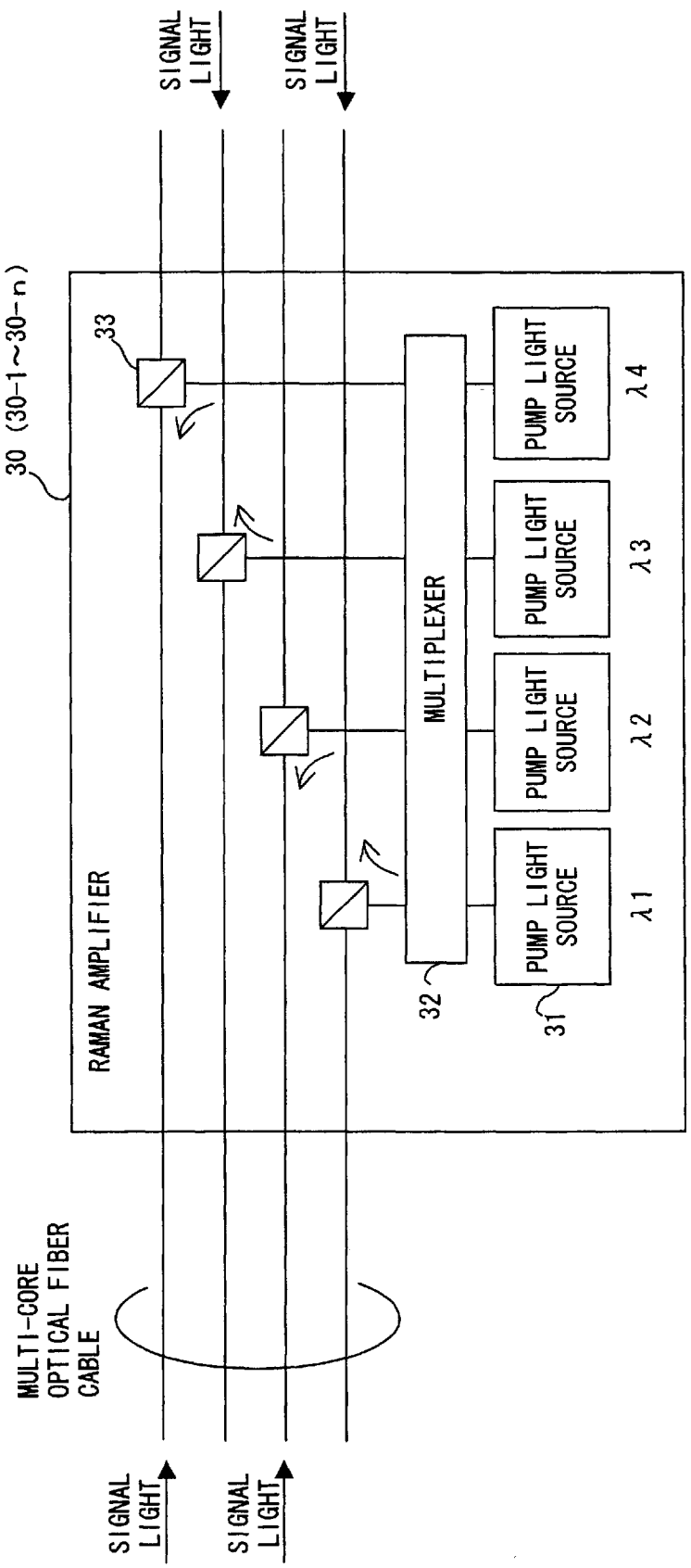
FIG. 6 shows the configuration of the Raman amplifier of the embodiment.

FIG. 6 shows a configuration of a Raman amplifier 30. The Raman amplifiers 30-1 through 30-n have the basically same configuration. The "Raman amplifier 30" indicates an arbitrary one of the Raman amplifiers 30-1 through 30-n.

The Raman amplifier 30 comprises a plurality of pump light sources 31, a multiplexer 32, and WDM couplers 33.

The plurality of pump light sources 31 generate a plurality sets of pump light with different wavelengths. In this embodiment, four pump light sources generate four sets of pump light with wavelength $\lambda 1$ through $\lambda 4$. For each pump light source 31, for example, a laser diode is used. Generally, a laser diode outputs light with a power corresponding to a given current. Most laser diodes have a back-power monitor function to detect the emitting power. In the following description, it is assumed that the emitting power of each pump light source 31 can be detected by the back-power monitor function or another method.

The multiplexer 32 multiplexes a plurality of sets of pump light outputted from the plurality of pump light sources 31. In this embodiment, a plurality of pump lights with wavelength $\lambda 1$ to $\lambda 4$ are multiplexed. The multiplexer 32 comprises a plurality of output ports, and outputs multiplexed pump light from each output port. The multiplexer 32 can be implemented by a plurality of WDM couplers. The WDM coupler 33 is provided for each optical fiber accommodated in the multi-core optical fiber cable and guides the pump light from the multiplexer 32 to a corresponding optical fiber. In this case, pump light is inputted to an optical fiber so as to be transmitted in the opposite direction of signal light.

In the configuration described above, a plurality of pump lights with different wavelengths are multiplexed, and the multiplexed pump lights are supplied to a plurality of optical fibers. Although in the example shown in FIG. 6, the Raman amplifier 30 is provided with four pump light sources 31, the present invention is not limited to this structure. The number of the pump light sources 31, for example, can be determined based on a required gain wavelength bandwidth. Although in this example, the number of the pump light sources 31 and the number of the optical fibers are matched, the present invention is not limited to this, their number can also be different.

Figure 7:
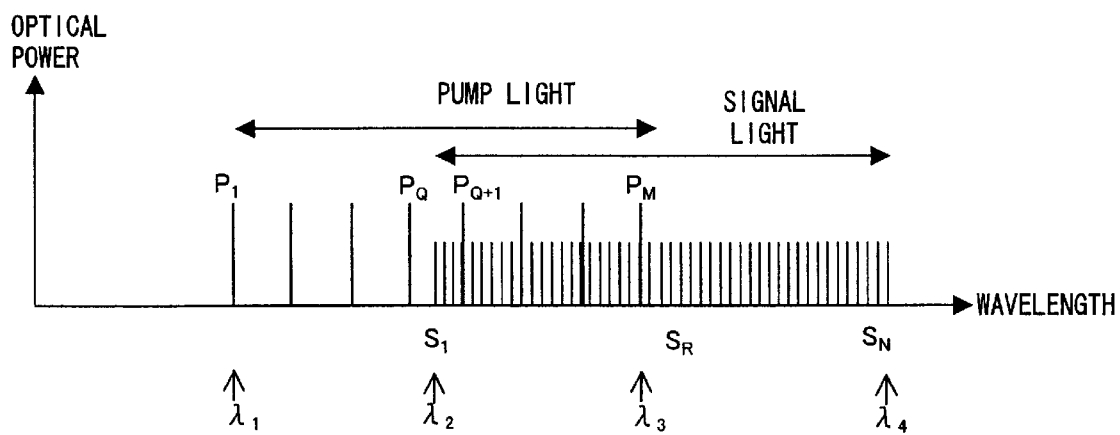
FIG. 7 shows the outline of the Raman amplifier of the embodiment.

FIG. 7 shows the outline of the Raman amplifier of this embodiment. The Raman amplifier 30 of this embodiment amplifies multi-wavelength light to be transmitted though a plurality of optical fibers, and performs the same amplification operations for each of the optical fibers. Therefore, the operation of an arbitrary optical fiber of a plurality of optical fibers accommodated in a multi-core optical fiber cable is described below.

In an optical transmission system provided with the Raman amplifier 30, a plurality of signals are multiplexed by WDM and are transmitted. Specifically, a plurality of signals are transmitted using carrier waves with different wavelengths. In this example, it is assumed that these signals are transmitted using wavelength region $\lambda 2$ to $\lambda 4$. In the following description, this carrier wave for transmitting signals is called "signal light". Specifically, in this optical transmission system, a plurality of signal lights S1 through Sn in a wavelength region $\lambda 2$ to $\lambda 4$ are multiplexed by WDM and are transmitted.

The Raman amplifier 30 uses a plurality of pump lights P1 through Pm. As described with reference to FIG. 6, these pump lights are generated by a plurality of pump light sources 31, multiplexed by the multiplexer 32, and guided to an optical fiber.

As shown in FIG. 7, the plurality of pump lights P1 through Pm are located in a wavelength band $\lambda 1$ to $\lambda 3$. In other words, a wavelength band used for pump light and a wavelength band used for signal light are partially overlapped. Specifically, pump lights PQ+1 to Pm and signal lights S1 to Sr coexist in the wavelength band $\lambda 1$ to $\lambda 3$.

In this way, in an optical transmission system using the Raman amplifier of this embodiment, a part of a wavelength band used for pump light and a part of wavelength band used for signal light are overlapped.

As described above, in Raman amplification, gain is obtained in a wavelength band corresponding to the wavelength of given pump light. Here, the difference between the wavelength of pump light and the wavelength at which Raman gain is obtained in relation to the pump light (hereinafter called a "Raman shift amount") is approximately 100 nm in 1.55 $\mu$m band. For example, if the wavelength of pump light is 1.45 $\mu$m, the peak wavelength at which Raman gain is generated due to the pump light is approximately 1.55 $\mu$m. If the wavelength of pump light is 1.45+ $\mu$m, the peak wavelength at which Raman gain is generated due to the pump light is approximately 1.55+ $\mu$m. That is to say, the wavelength band of gain obtained in Raman amplification is shifted by approximately 100 nm from the wavelength of pump light. For this reason, in FIG. 7, a wavelength band $\lambda 2$ to $\lambda 4$ for transmitting a plurality of signal lights S1 through Sn are shifted by 100 nm from a wavelength band $\lambda 1$ to $\lambda 3$ for transmitting a plurality of pump lights P1 through Pm.

Figure 8:
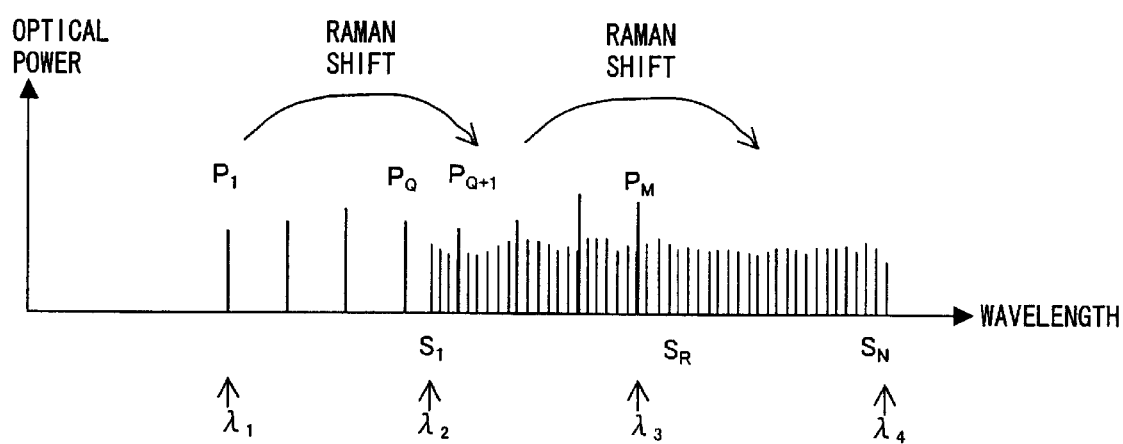
FIG. 8 shows the operation of the Raman amplifier of the embodiment.

FIG. 8 shows an operation of the Raman amplifier of this embodiment. If a plurality of pump lights P1 through PQ are inputted by the Raman amplifier 30, gain is obtained in a wavelength band $\lambda 2$ to $\lambda 4$. Thus, a plurality of signal lights S1 through Sr are amplified by Raman amplification due to the plurality of pump lights P1 through PQ. In this case, if the difference between wavelength $\lambda 1$ and wavelength $\lambda 2$ is 100 nm, a gain wavelength bandwidth $\lambda 2$ to $\lambda 3$ also becomes approximately 100 nm.

Similarly, if a plurality of pump lights PQ+1 through Pm are inputted by the Raman amplifier 30, gain is obtained in a wavelength band $\lambda 3$ to $\lambda 4$. Thus, a plurality of signal lights Sr through Sn are amplified by Raman amplification due to the plurality of pump lights PQ+1 through Pm. Here, since a bandwidth of wavelength band $\lambda 2$ to $\lambda 3$ where a plurality of pump lights PQ+1 through Pm are set is 100 nm, a gain bandwidth $\lambda 3$ to $\lambda 4$ also becomes approximately 100 nm. As a result, the entire gain bandwidth $\lambda 2$ to $\lambda 4$ becomes approximately 200 nm. Specifically, a gain bandwidth which is wider than a Raman shift amount can be obtained.

However, in the system of this embodiment, signal light and pump light coexist in a wavelength band $\lambda 2$ to $\lambda 3$. For this reason, not only the signal light, but also the pump light are amplified by the pump lights P1 through PQ in the wavelength band $\lambda 2$ to $\lambda 3$. Specifically, both the signal lights S1 through Sr and the pump lights PQ+1 through Pm are amplified by the pump lights P1 through PQ. As a result, the gain of a wavelength band $\lambda 3$ to $\lambda 4$ depends on not only the pump lights PQ+1 through Pm, but also the pump lights P1 through PQ for amplifying the pump lights PQ+1 to Pm. A Raman amplification operation is caused by not only a continuous wave (CW), such as pump light, but also by a discontinuous wave, such as signal light. Therefore, signal lights S1 through Sr in a wavelength band $\lambda 2$ to $\lambda 3$ generates gain in a wavelength band $\lambda 3$ to $\lambda 4$. In other words, the gain of the wavelength band $\lambda 3$ to $\lambda 4$ also depends on the signal lights S to Sr.

In this way, if a wavelength band used for pump light and a wavelength band used for signal light are overlapped, gain adjustment becomes complex. The gain adjustment method is described later.

Figure 9:
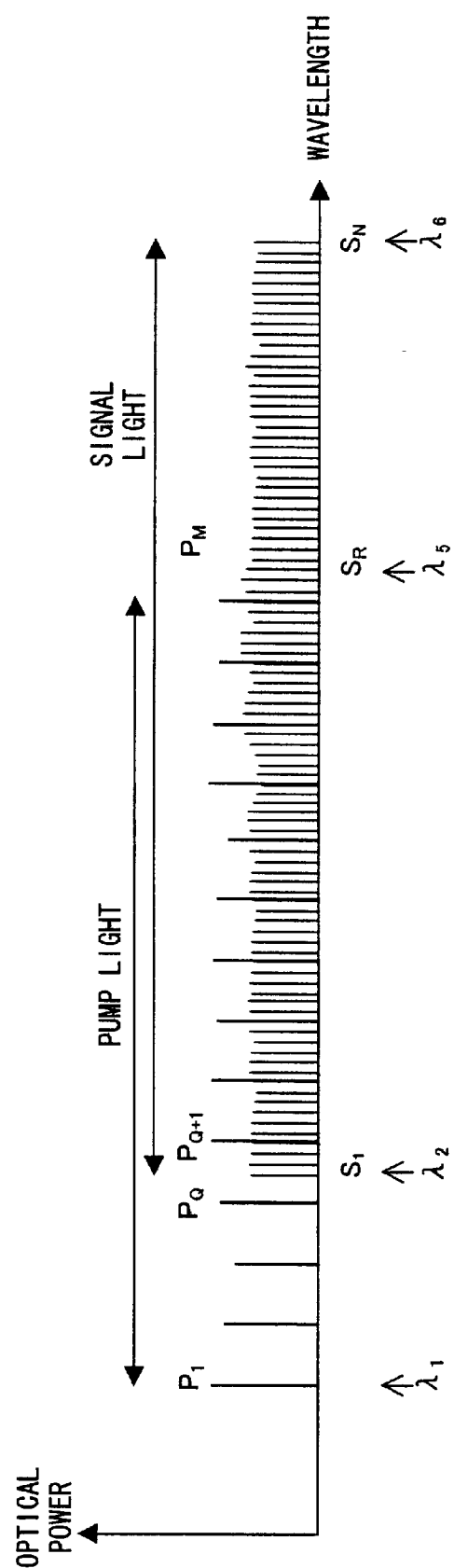
FIG. 9 shows the concept of Raman amplification for obtaining a wider gain wavelength bandwidth.

FIG. 9 shows a concept of Raman amplification for obtaining a wider gain wavelength bandwidth. In this example, a plurality of pump lights P1 through Pm are appropriately set in a wavelength band λ1 to λ5. In this case, Raman gain is obtained in a wavelength band λ2 to λ6 by the pump lights P1 to Pm. In this case, the wavelength band λ2 to λ6 is shifted by approximately 100 nm from the wavelength band λ1 to λ5. In addition, if the difference between wavelength λ1 and wavelength λ5 is 300 nm, gain bandwidth of approximately 300 nm can be obtained by the pump lights P1 to Pm.

In this configuration, since gain is obtained in a wavelength band λ2 to λ6 by the pump lights P1 through Pm, a plurality of signal lights S1 through Sn are set in this wavelength band λ2 to λ6. Therefore, pump light and signal light coexist in the wavelength band λ2 to λ5. Specifically, the pump lights PQ+1 through Pm and the signal lights S1 through Sr coexist in this wavelength band.

Figure 10:
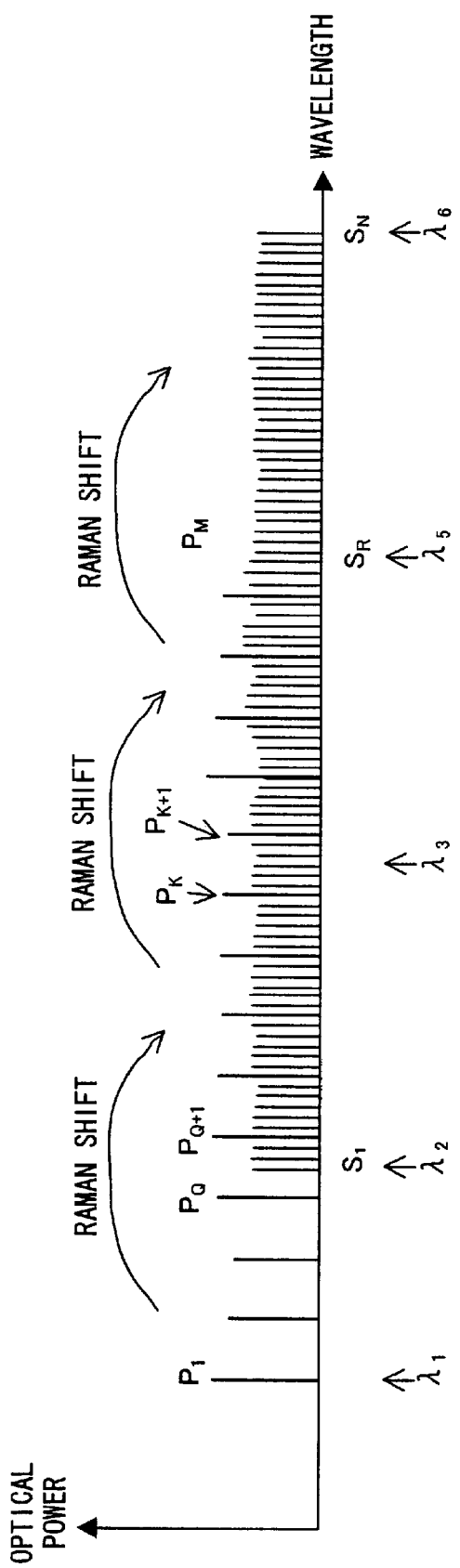
FIG. 10 shows the operation of the Raman amplifier shown in FIG. 9.

FIG. 10 shows the operation of the Raman amplifier shown in FIG. 9. This Raman amplifier performs Raman amplification of three stages. Specifically, Raman gain is obtained in a wavelength band λ2 to λ3 by a plurality of pump lights P1 through PQ set in a wavelength band λ1 to λ2. Raman gain is also obtained in a wavelength band λ3 to λ5 by a plurality of pump lights PQ+1 through Pk set in the wavelength band λ2 to λ3. Furthermore, Raman gain is obtained in a wavelength band λ5 to λ6 by a plurality of pump lights Pk+1 through Pm set in the wavelength band λ3 to λ5. In this case, if each of wavelength bands λ1 to λ2, λ2 to λ3, and λ3 to λ5 is 100 nm, the entire gain bandwidth λ2 to λ6 becomes approximately 300 nm. In other words, this Raman amplifier can obtain a gain wavelength bandwidth three times as much as Raman shift amount.

Although in the examples shown in FIGS. 7 through 10, a gain wavelength bandwidth two or three times as much as Raman shift amount is obtained, the present invention is not limited to this. In other words, if a plurality of pump lights are appropriately set over a wider wavelength band, a wider gain wavelength bandwidth can be obtained. For example, if a plurality of pump lights are appropriately set over wavelength region four times as much as Raman shift amount to perform 4-stage Raman amplification, a gain wavelength bandwidth four times as much as a Raman shift amount (that is, 400 nm) can be obtained.

FIGS. 11A and 11B show how to locate signal light and pump light. It is assumed that the transmission system of this embodiment is WDM transmission system, and the wavelength (frequency) of a carrier wave to be used for this WDM transmission is stipulated in ITU-T (International Telecommunication Union Telecommunication standardization sector). This specification stipulated in ITU-T is often called the "ITU-T grid".

The standard frequency of the ITU-T grid is 193.1 THz. As shown in FIG. 11A, for carrier waves, this standard frequency and frequencies obtained by shifting the standard frequency by 25 GHz every time are used. Around this frequency region, 25 GHz corresponds to approximately 0.2 nm.

A plurality of signal lights are basically set based on the ITU-T grid. Specifically, a plurality of signal lights are set at intervals of 25 GHz (approximately 0.2 nm). A plurality of pump lights are also set based on the ITU-T grid. Here, the frequency of each of the pump lights is basically 193.1±0.025×n (THz). In this case, "n" is an integer. However, the pump lights are set at longer intervals than the signal lights.

In this way, in this embodiment, both signal light and pump light are set based on the ITU-T grid. At this time, although the signal lights are basically set at intervals of 25 GHz, they are not set in a wavelength where pump light is set. In other words, the same wavelength is not allocated to signal light and pump light. Since the power of pump light is usually higher than that of signal light, the spectrum of pump light is wider than that of signal light, as shown in FIG. 11B. Therefore, if a specific wavelength is allocated to pump light, several pieces of wavelength in the vicinity of the wavelength cannot be allocated to signal light.

Figure 12:
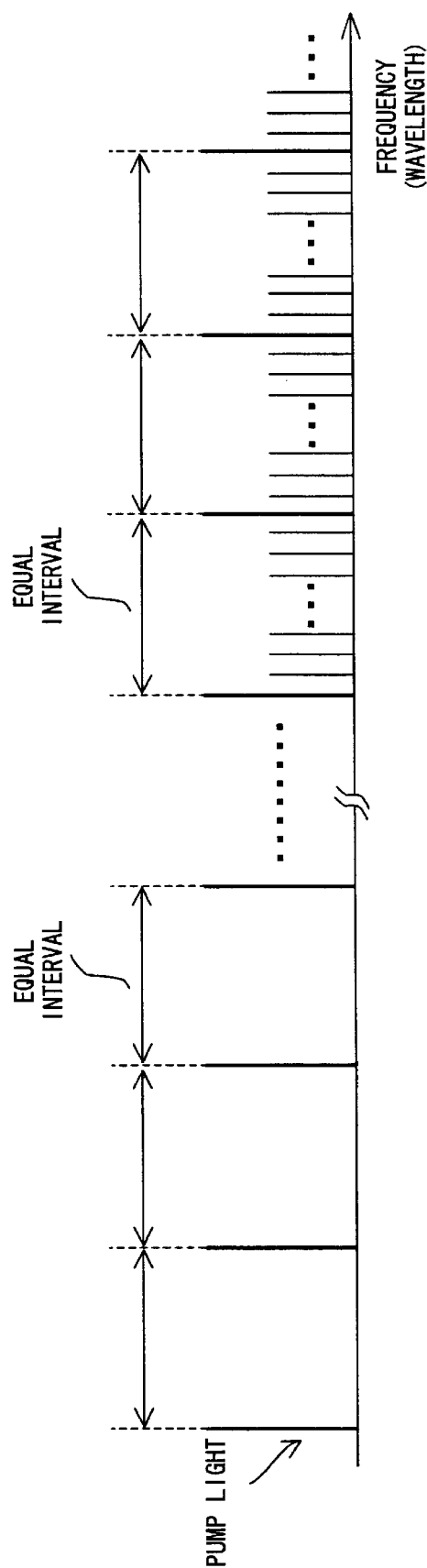
FIG. 12 shows how to locate pump light.

As shown in FIG. 12, a plurality of pump lights are basically located at equal intervals. If a plurality of pump lights are located at equal intervals, Raman gain can be easily adjusted by the control of the respective power of the plurality of pump lights.

Next, the several configurations and methods for supplying pump light to a transmission line are described. In the following description, it is assumed that a plurality of signal lights S1 through Sn are amplified by a plurality of pump lights P1 through Pm.

Figure 13:
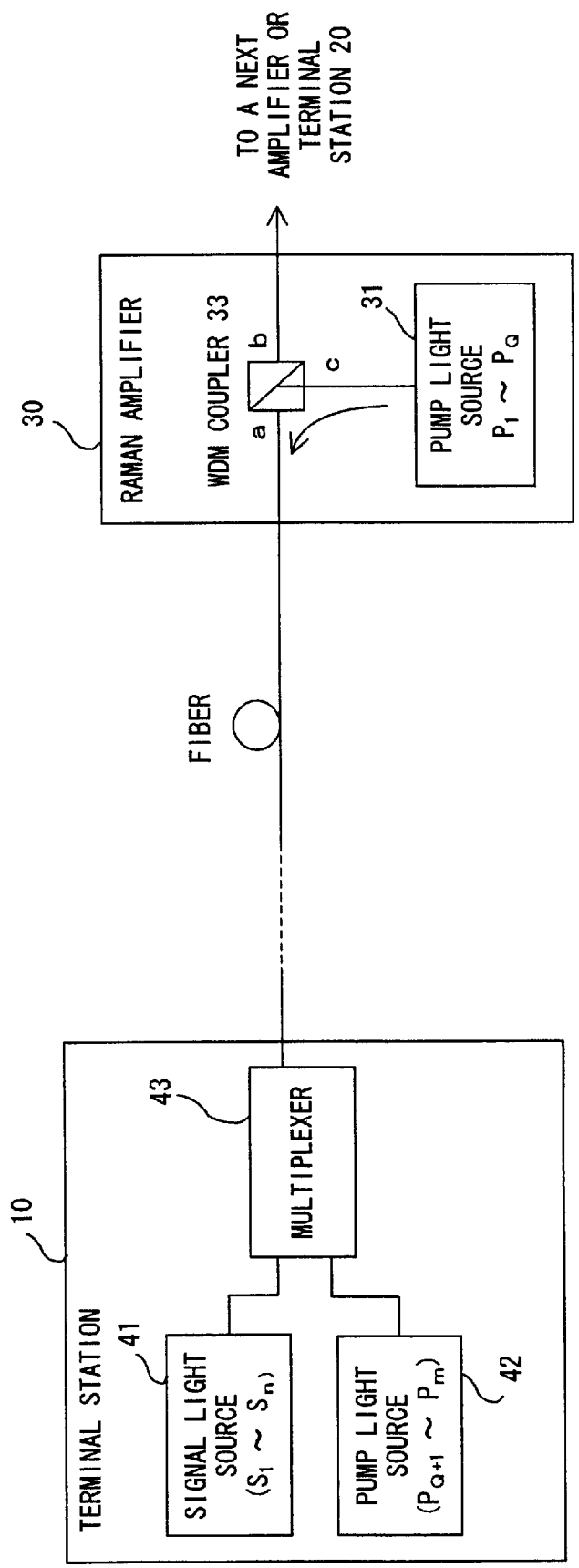
FIG. 13 shows an example of how to provide pump light to a transmission line.

FIG. 13 shows a method for supplying pump light to a transmission line. According to this method, each Raman amplifier 30 supplies a plurality of pump lights P1 through PQ, and the terminal station 10 supplies a plurality of pump lights PQ+1 through Pm.

The terminal station 10 comprises a signal light source 41 for generating a plurality of signal lights S1 through Sn, a pump light source 42 for generating a plurality of pump lights PQ+1 through Pm, and a multiplexer 43 for multiplexing the signal lights and the pump lights. The signal lights and the pump lights are multiplexed by WDM using these units and are transmitted to a transmission line optical fiber. Both of the wavelengths of each of the signal lights S1 through Sn and each of the pump lights PQ+1 through Pm are assumed to be longer than the wavelength λ2 shown in FIGS. 7 through 9.

Each Raman amplifier 30 comprises a pump light source 31 for generating a plurality of pump lights P1 through PQ and a WDM coupler 33 for guiding the pump lights to the transmission line. The pump light source 31 comprises, for example, a plurality of laser diodes LD for generating the plurality of pump lights. The pump lights are multiplexed by a multiplexer (the multiplexer 32 shown in FIG. 6) and are inputted to the WDM coupler 33. Each of the wavelengths of the pump lights P1 through PQ is assumed to be shorter the wavelength λ2 shown in FIGS. 7 through 9.

The WDM coupler 33 comprises three input/output ports (ports a, b, and c). Port a is connected to the optical fiber on the terminal station 10 side, port b is connected to the optical fiber on the terminal station 20 side, and port c receives pump light generated by the pump light source 31. Upon receipt of light with a longer wavelength than wavelength λ2 from port a, the WDM coupler 33 outputs the light through port b. Specifically, upon receipt of the signal lights S1 through Sn and the pump lights PQ+1 through Pm via the optical fiber on the terminal station 10 side, the WDM coupler 33 outputs them to the optical fiber on the terminal station 20 side. Upon receipt of light with a shorter wavelength than the wavelength λ2 from port c, the WDM coupler 33 outputs the light via port a. Specifically, the WDM coupler 33 guides the pump lights P1 through PQ received via port c to the optical fiber on the terminal station 10 side.

Then, the operation of a Raman amplifier with this configuration is described with reference to FIG. 8. In this system, the pump lights P1 through PQ generated by the pump light sources 31 are supplied to the transmission line optical fiber. As a result, Raman gain is obtained in a wavelength band λ2 to λ3. In other words, light located in the wavelength band λ2 to λ3 are amplified by the pump lights P1 through PQ. Specifically, both the signal lights S1 through Sr and pump lights PQ+1 through Pm located in the wavelength band λ2 to λ3 are amplified by the pump lights P1 through PQ. In addition, Raman gain is obtained in a wavelength band λ3 to λ4 by the amplified pump lights PQ+1 through Pm. That is to say, the signal lights Sr+1 through Sn are located in a wavelength band λ3 to λ4 by the pump lights PQ+1 through Pm. In this way, the signal lights S1 through Sn are amplified by each Raman amplifier 30.

Figure 14:
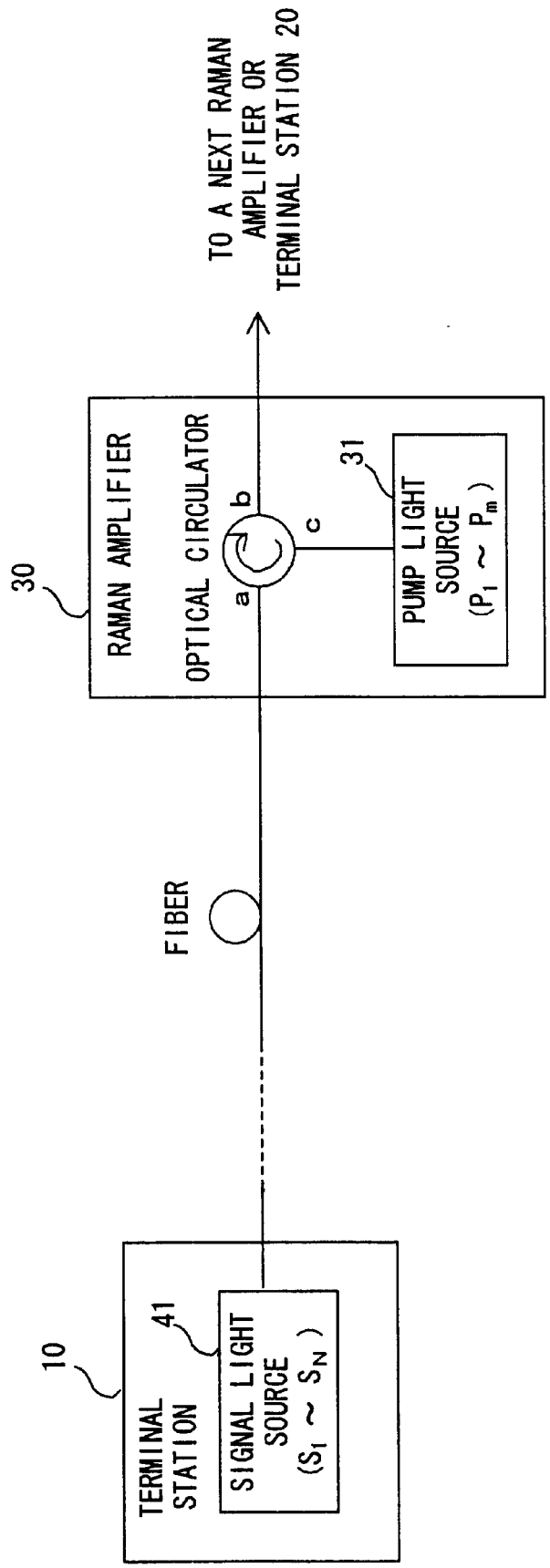
FIG. 14 shows another example of how to provide pump light to a transmission line.

FIG. 14 shows another method for supplying pump light to a transmission line. According to this method, each Raman amplifier 30 supplies a plurality of pump light P1 to Pm.

The terminal station 10 comprises signal light source 41 for generating the signal lights S1 through Sn. The signal lights S1 through Sn are multiplexed by WDM and are transmitted to the transmission line optical fiber.

Each Raman amplifier 30 comprises pump light source 31 for generating the pump lights P1 through Pm and an optical circulator 34 for guiding the pump lights to the transmission line. In this case, the pump light source 31 comprises, for example, a plurality of laser diodes LD for generating the plurality of pump lights. The plurality of pump lights are multiplexed by a multiplexer (the multiplexer 32 shown in FIG. 6), which is not shown in FIG. 14, and are inputted to the optical circulator 34.

The optical circulator 34 comprises three input/output ports (ports a, b, c). Here, light inputted from port a is guided to port b, light inputted from port b is guided to port c, and light inputted from port c is guided to port a. Therefore, the optical circulator 34 guides the signal lights S1 through Sn inputted through the optical fiber on the terminal station 10 side to the optical fiber on the terminal station 20 side. In addition, the optical circulator 34 guides the pump lights P1 through Pm generated by the pump light source 31 to the optical fiber on the terminal station 10 side.

Then, the operation of this Raman amplifier is described with reference to FIG. 8. In this amplifier, the pump lights P1 through Pm generated by the pump light source 31 are supplied to the transmission line optical fiber. As a result, Raman gain is obtained in a wavelength band λ2 to λ4. That is, the signal lights S1 through Sn located in the wavelength band λ2 to λ4 are amplified by the pump lights P1 through Pm.

Figure 15:
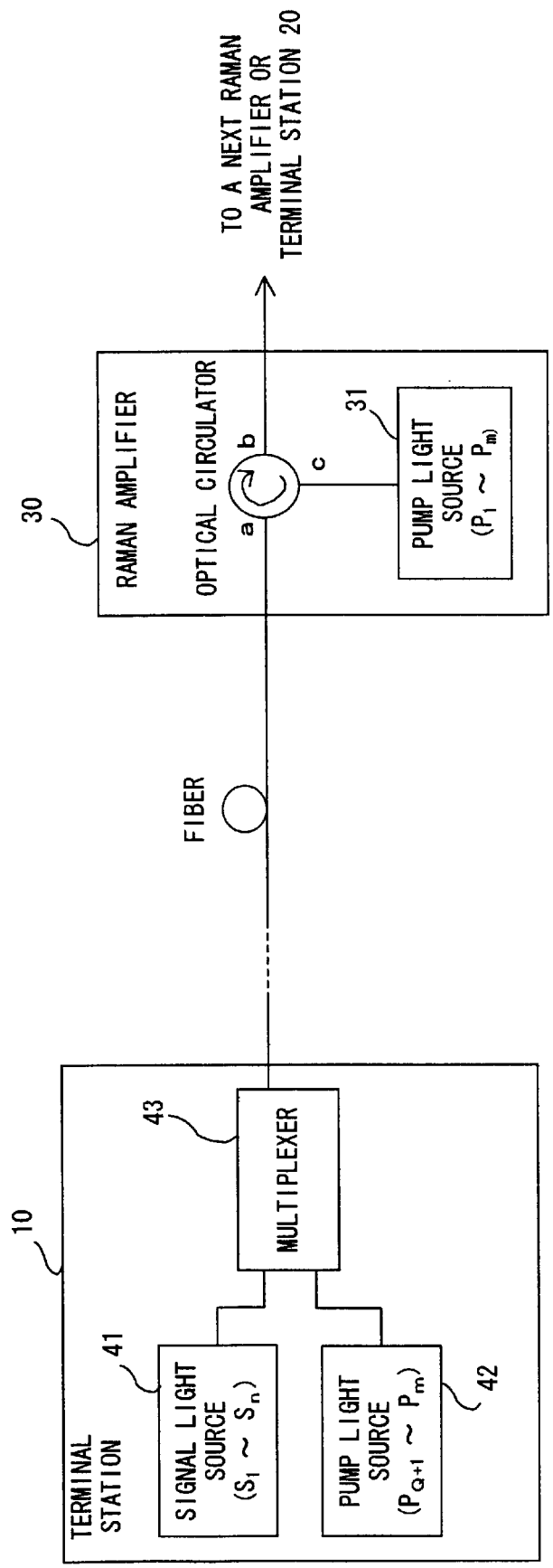
FIG. 15 a variation of the method shown in FIG. 14.

FIG. 15 shows a variation of the method shown in FIG. 14. According to this method, each Raman amplifier 30 supplies the pump lights P1 through Pm and the terminal station 10 supplies pump lights (the pump lights PQ+1 through Pm) within a wavelength band where signal lights are located. Since the operation of this configuration is the same as that described with reference to FIG. 14, the explanation is omitted.

In the systems shown in FIGS. 13 through 15, it is basically preferable that an optical spectrum of each pump light is narrow. It is preferable for at least the spectrum of pump light located within a band where signal lights are located (for example, the pump lights PQ+1 through Pm) to be similar to that of signal light. The optical spectrum of each pump light is adjusted, for example, using an optical fiber grating.

However, in a WDM transmission system, generally, it is preferable that the level of each signal light included in multi-wavelength light is equalized. To equalize the multi-wavelength light, the gain of each amplifier must be adjusted. A method for adjusting the gain of each Raman amplifier is described below.

Figure 16:
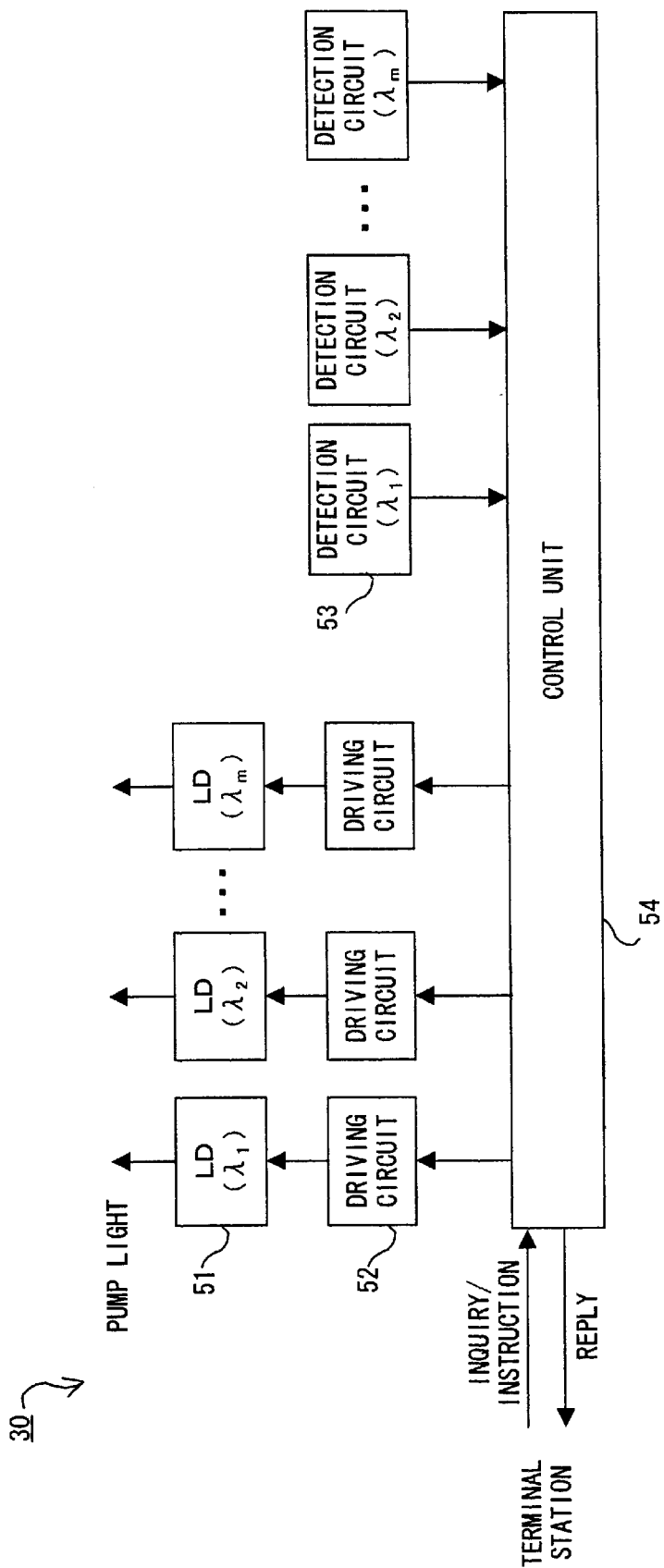
FIG. 16 shows a function to adjust gain in a Raman amplifier.

FIG. 16 shows a function to adjust gain in each Raman amplifier 30. The Raman amplifier 30 comprises a plurality of pump light sources 51. Each of these pump light sources 51 is a laser diode with a different oscillation frequency and is driven by a corresponding driving circuit 52. The driving circuit 52 supplies a corresponding pump light source 51 with current according to an instruction from a control unit 54. Each detection circuit 53 detects the gain of a corresponding wavelength within a wavelength band where signal lights are transmitted. A method for detecting gain for each wavelength utilizes the prior art.

The control unit 54 checks gain for each wavelength in response to an inquiry from the terminal station 10 or 20. At this moment, the output of each detection circuit 53 is referenced. Then, the control unit 54 notifies the terminal station 10 or 20 of the detection result. The control unit 54 controls the driving circuit 52 according to an instruction from the terminal station 10 or 20. Thus, the emitting power of a particular pump light source 51 can be adjusted according to an instruction from the terminal station 10 or 20.

The terminal station 10 or 20 comprises a control circuit for adjusting the gain of each Raman amplifier. This control circuit adjusts the gain of each Raman amplifier when this optical transmission system is established or regularly after then. Specifically, this control circuit first makes an inquiry for each Raman amplifier about gain for each wavelength. Then, in response to the inquiry, the control circuit instructs each Raman amplifier to equalize the wavelength characteristic of gain in each Raman amplifier. For example, if the gain of a specific wavelength in a specific Raman amplifier is relatively low, an instruction is issued to increase the power of pump light of a wavelength shorter by approximately 100 nm than the wavelength. In this case, a Raman amplifier that has received the instruction adjusts the power of corresponding pump light according to the instruction. Thus, gain can be equalized in each Raman amplifier.

In a case where a part of pump lights (the pump lights PQ+1 through Pm) is generated by the terminal station 10, as shown in FIG. 13, not only the pump light generated by each Raman amplifier, but pump light generated by the terminal station 10 should be adjusted. In this case, if the terminal station 10 manages the gain of Raman amplifiers, the terminal station 10 itself can adjust the pump lights PQ+1 through Pm. If the terminal station 20 manages the gain of Raman amplifiers, the terminal station 20 can adjust the pump lights PQ+1 through Pm by sending an instruction to the terminal station 10.

In this way, in the transmission system of this embodiment, the wavelength deviation of gain in each Raman amplifier is reduced by appropriately adjusting each optical power of the pump lights P1 through Pm.

Figure 17:
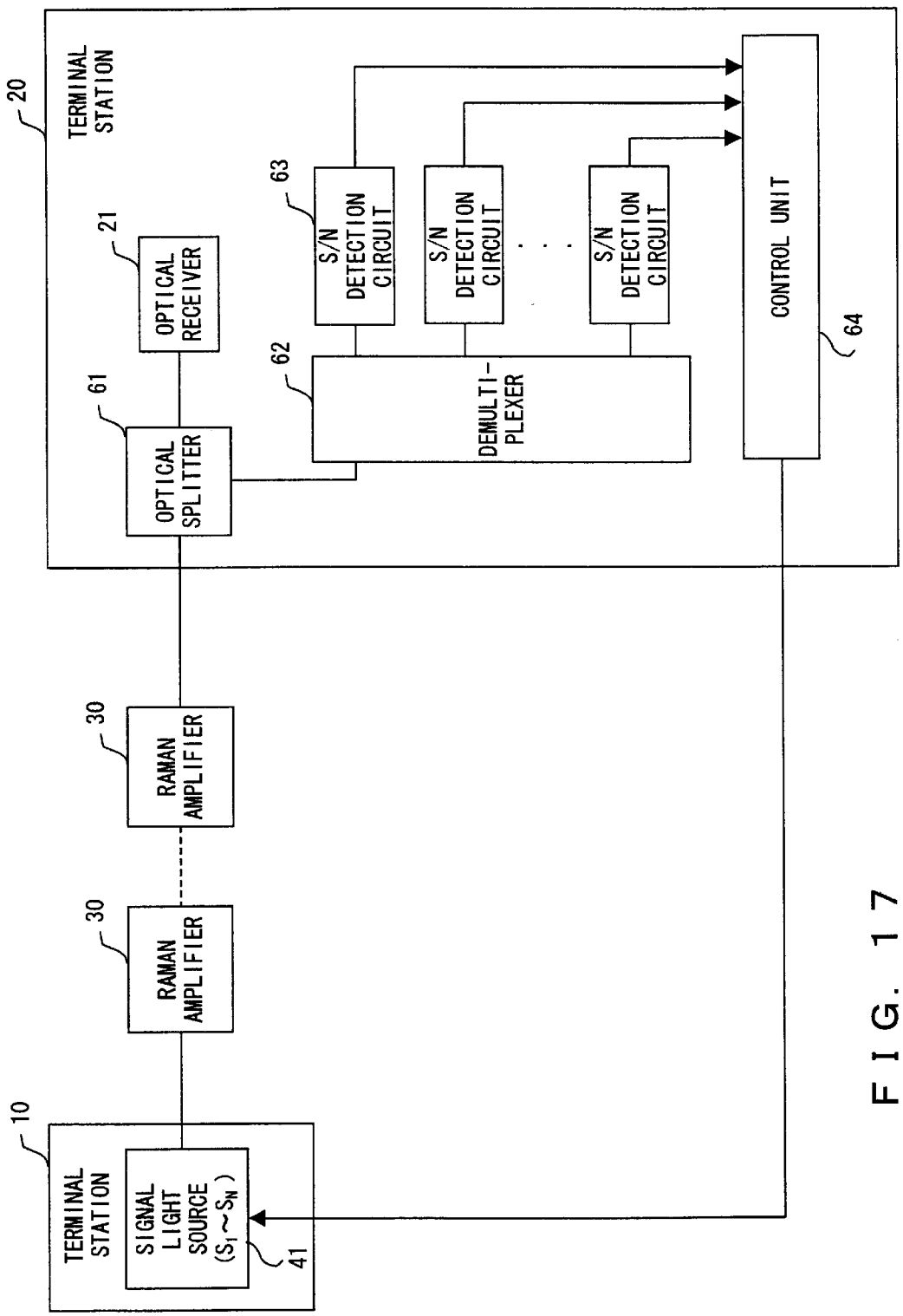
FIG. 17 shows how to adjust the optical S/N ratio of signal light.

FIG. 17 shows a method for adjusting the optical S/N ratio of the signal lights S1 through Sn. The optical S/N ratio of the signal lights S1 through Sn can be controlled by adjusting the respective optical power of the signal lights S1 through Sn generated by the signal light source 41. Therefore, in the transmission system of this embodiment, an optical S/N ratio is detected for each wavelength in the terminal of the receiving side (terminal station 20), and the detection result is fed back to the terminal station of the transmitting side (terminal station 10).

The terminal station 20 comprises an optical splitter 61 for splitting multi-wavelength light including the signal lights S1 through Sn, a demultiplexer 62 for extracting the signal lights S1 through Sn from the multi-wavelength light splitted by the optical splitter 61, and S/N detection circuits 63 for detecting the optical S/N ratio of each of the signal lights S1 through Sn extracted by the demultiplexer 62. A control circuit 64 checks the deviation of the optical S/N ratio of each of the signal lights S1 through Sn based on the output of each S/N detection circuit 63 and generates an instruction to reduce the deviation. Specifically, if, for example, the optical S/N ratio of signal light of a specific wavelength is relatively bad, an instruction to increase the power of the signal light of the specific wavelength is generated. Then, the generated instruction is transmitted to the terminal station 10.

Upon receipt of the instruction from the terminal station 20, the terminal station 10 adjusts the power of the signal light source 41 according to the instruction. Thus, the deviation of the optical S/N ratio of each of the signal lights S1 through Sn will be reduced.

In this way, in the optical transmission system of this embodiment, the gain due to Raman amplification and the optical S/N ratio of signal light are individually adjusted. That is, to reduce the deviation of Raman gain depending on a wavelength, the optical power of each pump light is appropriately adjusted (pump light pre-emphasis). Alternatively, to reduce the deviation of the optical S/N ratio of a plurality of signal lights, the optical power of each of the plurality of signal lights is appropriately adjusted (signal light pre-emphasis).

In the Raman amplifier of the embodiment, as describe above, apart of the signal lights (for example, the signal lights S1 through Sr in FIG. 7) works as pump lights for signal light with longer wavelength. However, since optical power of the signal light is much smaller than that of the pump light, Raman gain due to the signal light is smaller than Raman gain due to the pump light. Therefore, a gain of the Raman amplifier is substantially adjusted to desired characteristics by controlling optical power of each pump light. Here, optical power of the signal light can be slightly adjusted when needed. In addition, error ratio of each of wavelength can be used in replace of the optical S/N ratio as a control parameter.

Next, a method for improving the transmitting performance of an optical transmission system using the characteristic of Raman amplification is described.

Figure 18:
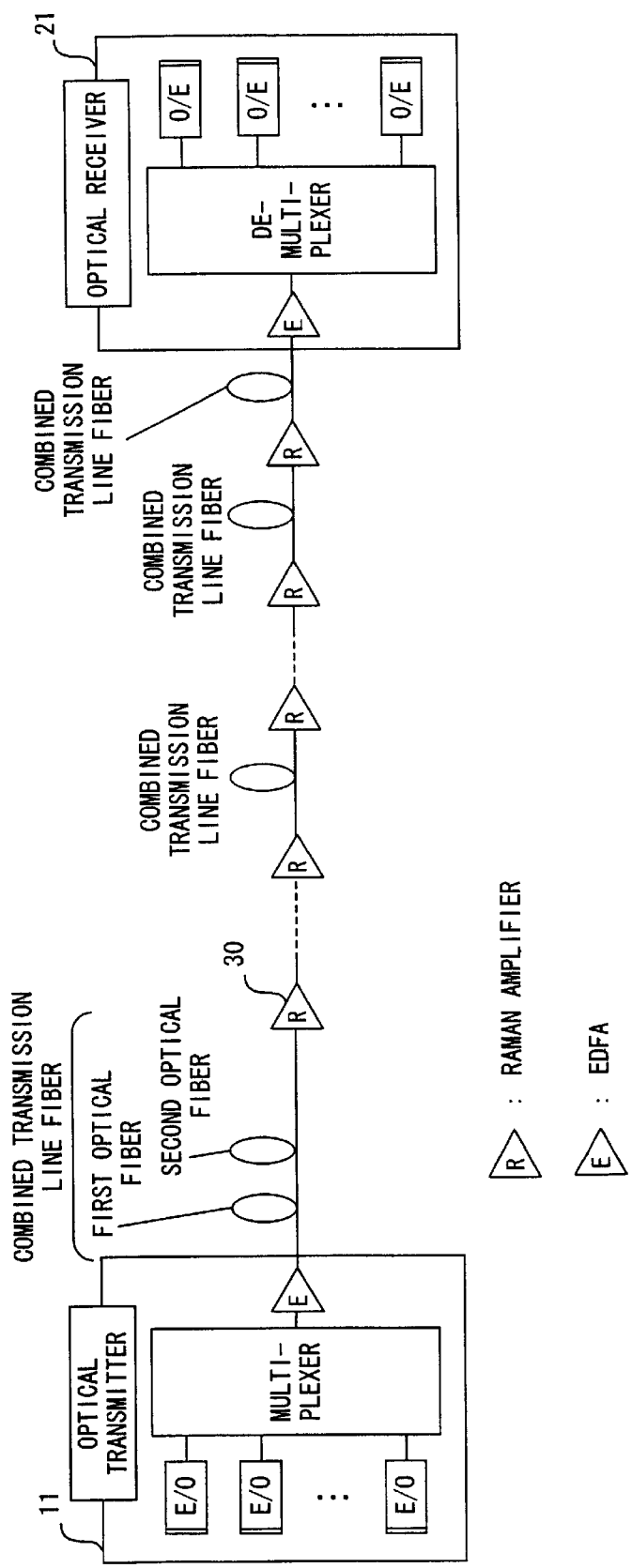
FIG. 18 and FIG. 20 show the configuration of an optical transmission system provided with combined transmission line fiber.

FIG. 18 shows the configuration of an optical transmission system provided with a combined transmission line fiber. In this system, a combined transmission line fiber is used for an optical fiber to transmit multi-wavelength light. This combined transmission line fiber is composed of a first optical fiber and a second optical fiber with a smaller mode field diameter (effective cross section or core diameter) than that of the first optical fiber. Here, for an example, it is preferable that the first and second optical fibers have positive dispersion and negative dispersion, respectively. When signal light is transmitted from the optical transmitter 11 to the optical receiver 21, in each combined transmission line, the signal light is first transmitted through the first optical fiber and then is transmitted through the second optical fiber.

Figure 19:
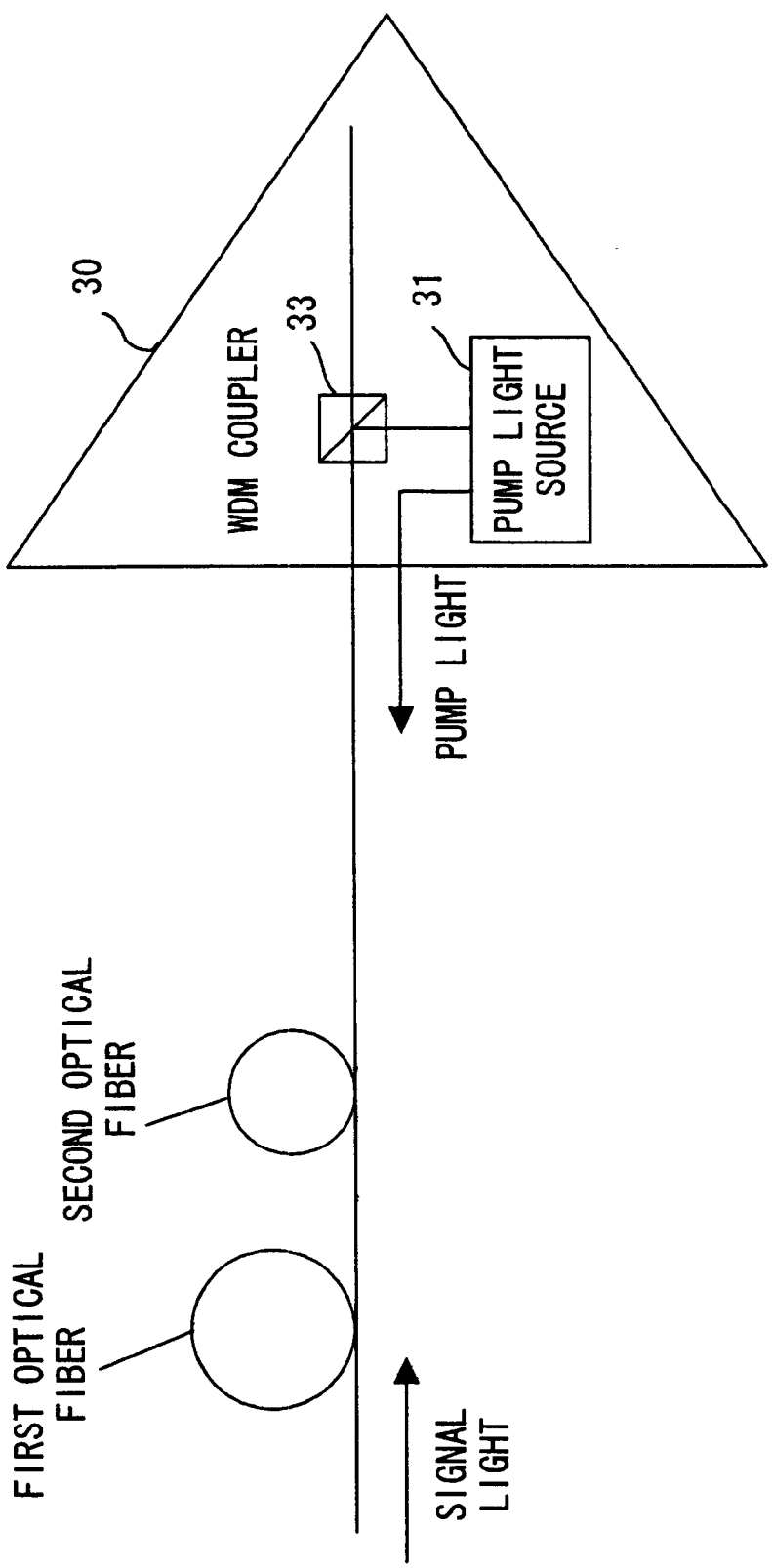
FIG. 19 and FIG. 21 show the configuration of a Raman amplifier in the system shown in FIG. 18 and FIG. 20, respectively.

FIG. 19 shows the configuration of a Raman amplifier in the system shown in FIG. 18. This drawing shows an arbitrary one of a plurality of Raman amplifiers installed in the transmission line.

The Raman amplifier 30 supplies pump light to a transmission line in such a way that pump light is transmitted in the opposite direction of signal light. That is, pump light is supplied to the transmission line by a backward pump method. For this reason, pump light generated by the pump light source 31 is first supplied to the second optical fiber and is supplied to the first optical fiber after passing through the second optical fiber. Here, it is well known that, the higher is the power density of pump light supplied to an optical fiber, the more efficiently gain is obtained in Raman amplification. In other words, the smaller is the mode field diameter of an optical fiber, the more efficiently gain is obtained in Raman amplification. Therefore, gain can be efficiently obtained at the second optical fiber in this embodiment. The optical S/N ratio of signal light can be improved accordingly.

This system can also reduce the non-linear effect on an optical transmission line. It is well known that the smaller is the mode field diameter of an optical fiber, the greater is the non-linear effect on a transmission line. Alternatively, the higher is the optical power of signal light, the greater is the non-linear effect on a transmission line. However, in this system, while the optical power of signal light is high, the signal light is transmitted through the first optical fiber with a fairly large mode field diameter. Therefore, the non-linear effect generated on the first optical fiber is small. In addition, since signal light reaches the second optical fiber with a small mode field diameter, the signal light is sufficiently attenuated, the non-linear effect generated on the second optical fiber is also small. Therefore, the non-linear effect is suppressed over the entire transmission line, and the distortion of a transmission waveform is small.

In this way, if a combined transmission line composed of the first and second optical fibers is used, the optical S/N ratio is improved and simultaneously the distortion of a signal waveform due to non-linear effect is suppressed. The ratio in length between the first and second optical fibers, is, for example, 2 to 1. The effective areas of the first and second optical fibers are, for example, 110 $\mu m^2$ and 20 $\mu m^2$, respectively.

Figure 20:
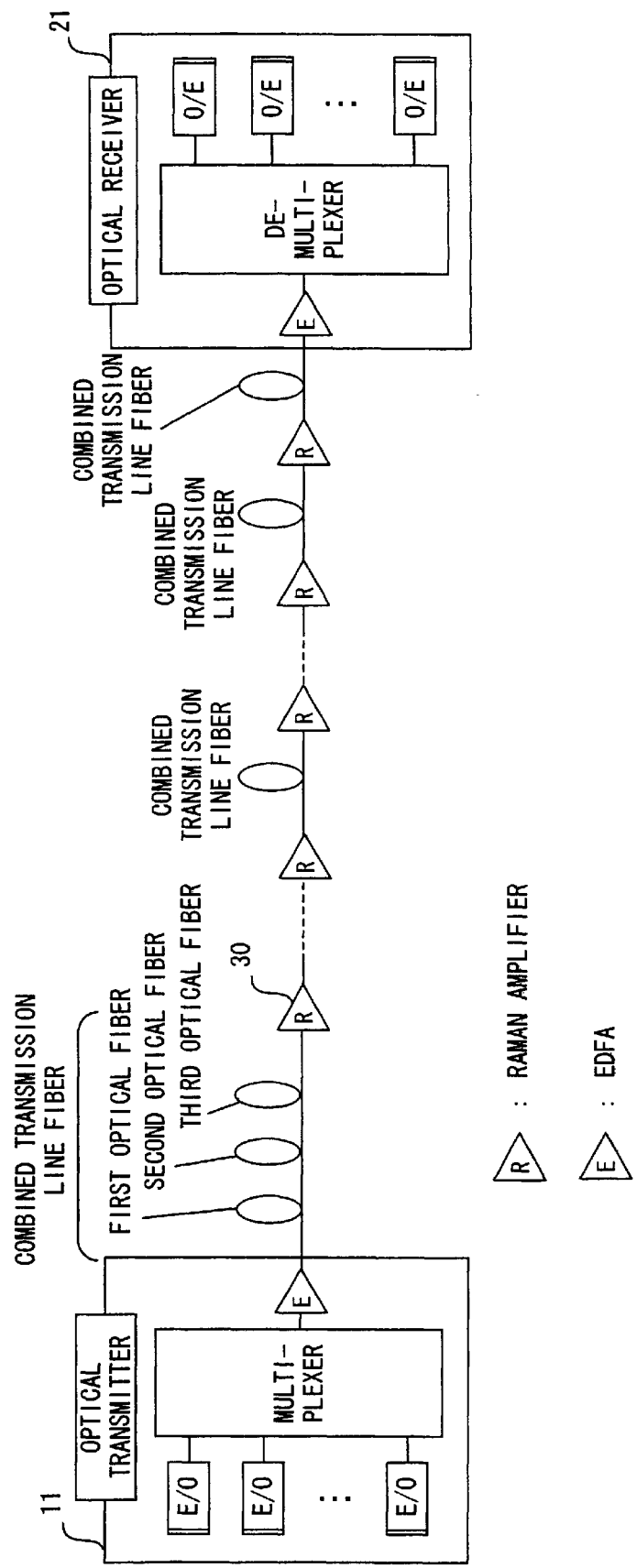
Figure 21:
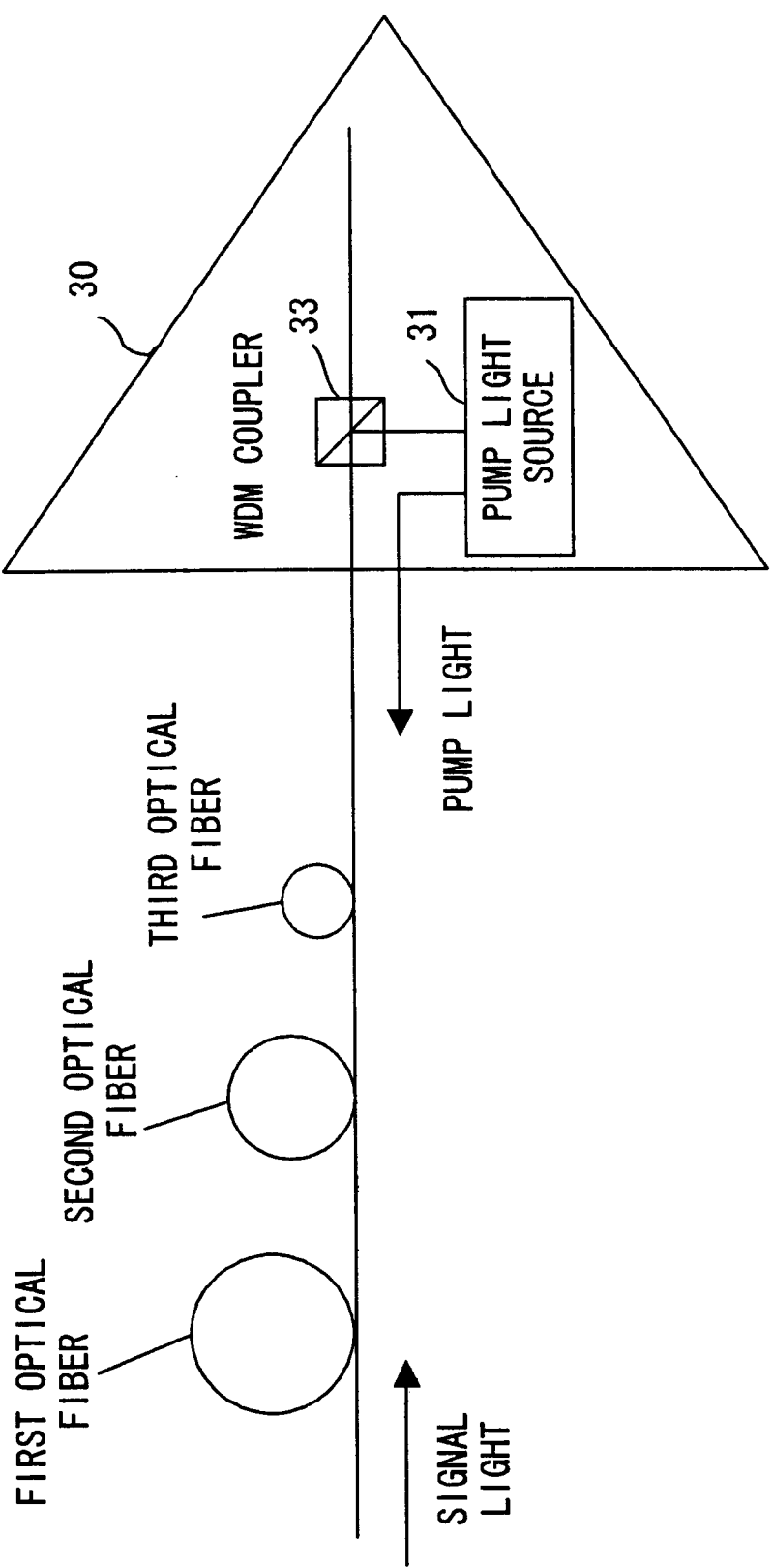

Although in the examples shown in FIGS. 18 and 19, a combined transmission line fiber is composed of two kinds of optical fibers with different mode field diameters, the present invention is not limited to this structure. That is, the combined transmission line fiber can also be composed of three or more kinds of optical fibers. For example, in the examples shown in FIGS. 20 and 21, each combined transmission line fiber is composed of first through third optical fibers. In this case, the mode field diameters of the first and third optical fibers are the largest and smallest, respectively. In this way, it is recommended that if a combined transmission line fiber is composed of a plurality of kinds of optical fibers, the fibers are connected to one another in such a way that the mode field diameters of the fibers may gradually become smaller in the transmitting direction of signal light.

In Raman amplification, as described with reference to FIGS. 7 through 10, when pump light is supplied to an optical fiber, gain is obtained in a wavelength band shifted by the Raman shift amount from the wavelength of the pump light to the long wavelength side. In this case, if there is light in this gain wavelength band, the light is amplified. For example, if in FIG. 8, the pump lights P1 through PQ are supplied to an optical fiber, light located in a wavelength band $\lambda 2$ to $\lambda 3$ (including both signal light and pump light) is amplified. In this case, the light located in the wavelength band $\lambda 2$ to $\lambda 3$ is amplified by absorbing a part of energy provided by the pump lights P1 through PQ.

In this way, Raman amplification is caused by a phenomenon that energy of pump light is absorbed by light with longer wavelength than that of the pump light. Here, when a part of the energy of the pump light is absorbed by other light, the optical power of the pump light decreases by that energy. On the other hand, if energy of the pump light is not absorbed by other light, there is hardly any decrease in the optical power of the pump light. In other words, there is a possibility that the optical power of pump light may vary depending on whether energy of the pump light is absorbed by other light.

This problem is not limited to pump light. For example, in FIG. 8, the energy of light located in a wavelength band λ1 to λ2 is absorbed by light located in a wavelength band λ2 to λ3, and the energy of light located in the wavelength band λ2 to λ3 is absorbed by light located in a wavelength band λ3 to λ4. However, the energy of light located in the wavelength band λ3 to λ4 is not absorbed by other light. As a result, there is s possibility that the gain of the wavelength band λ3 to λ4 may become too high. Alternatively, there is a possibility that the optical level of signal light located in the wavelength band λ3 to λ4 may become too high.

Figure 22:
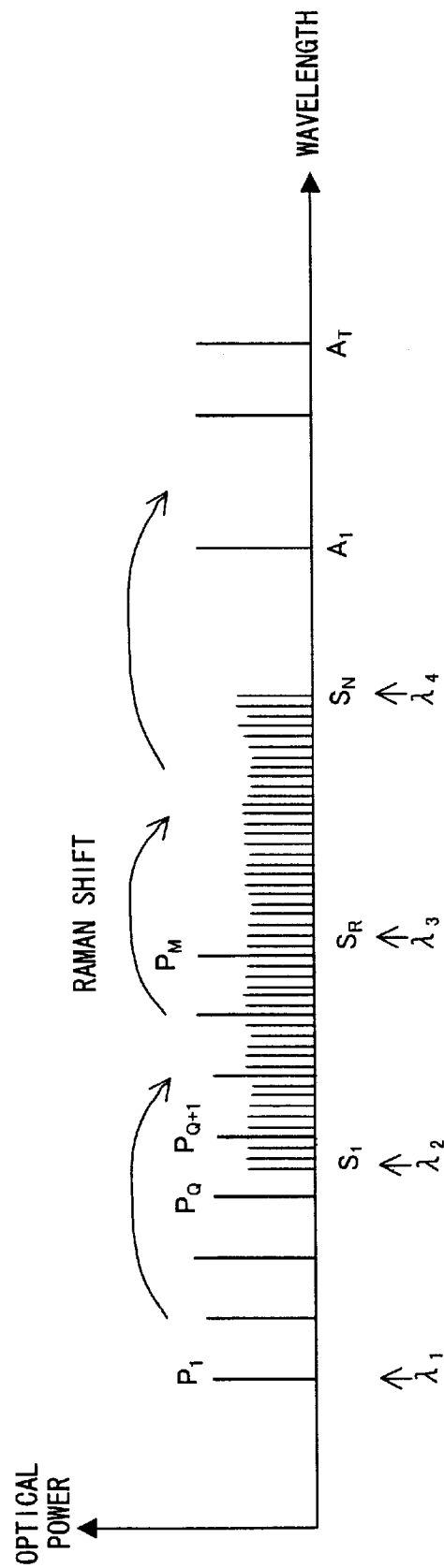
FIG. 22 and FIG. 23 show the location of auxiliary light.

To solve this problem, in the system of this embodiment, auxiliary lights A1 through At are located on a longer wavelength side of a wavelength region where the signal lights S1 through Sn are located, as shown in FIG. 22. Thus, the energy of the signal lights S1 through Sn located in the wavelength band λ3 to λ4 are absorbed by the auxiliary lights A1 through At. In other words, the gain of the wavelength band λ3 to λ4 can be appropriately suppressed.

Figure 23:
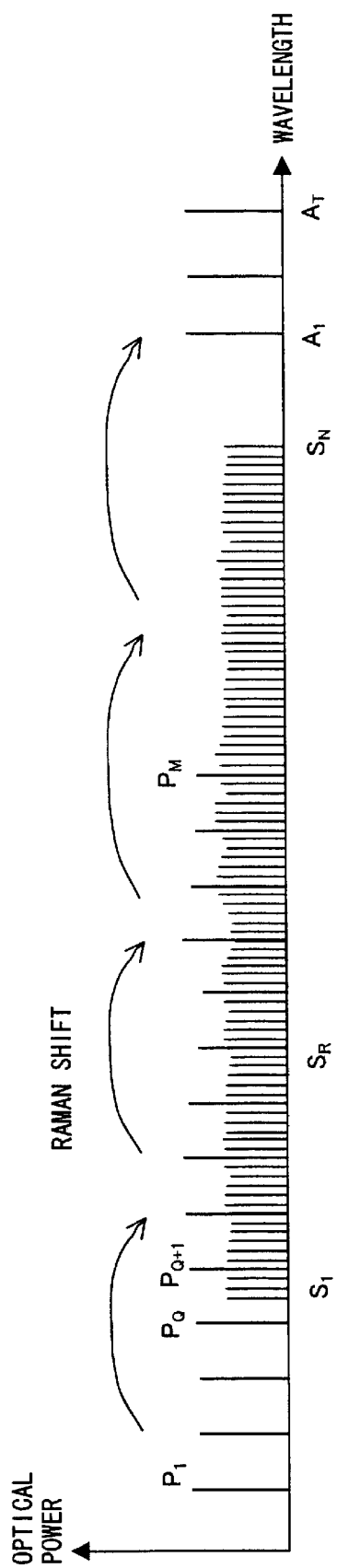
Figure 24:
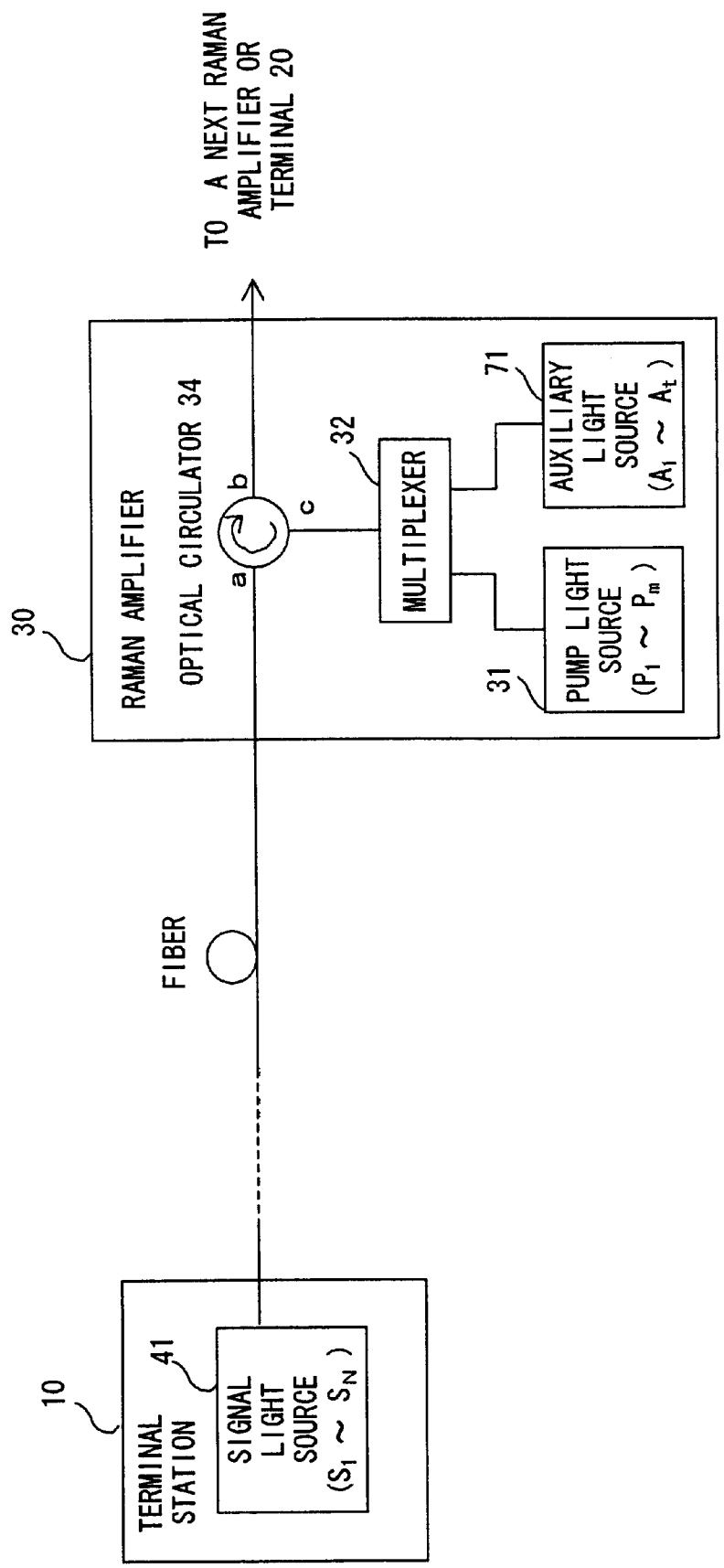
FIG. 24 through FIG. 27 show how to provide auxiliary light.
Figure 25:
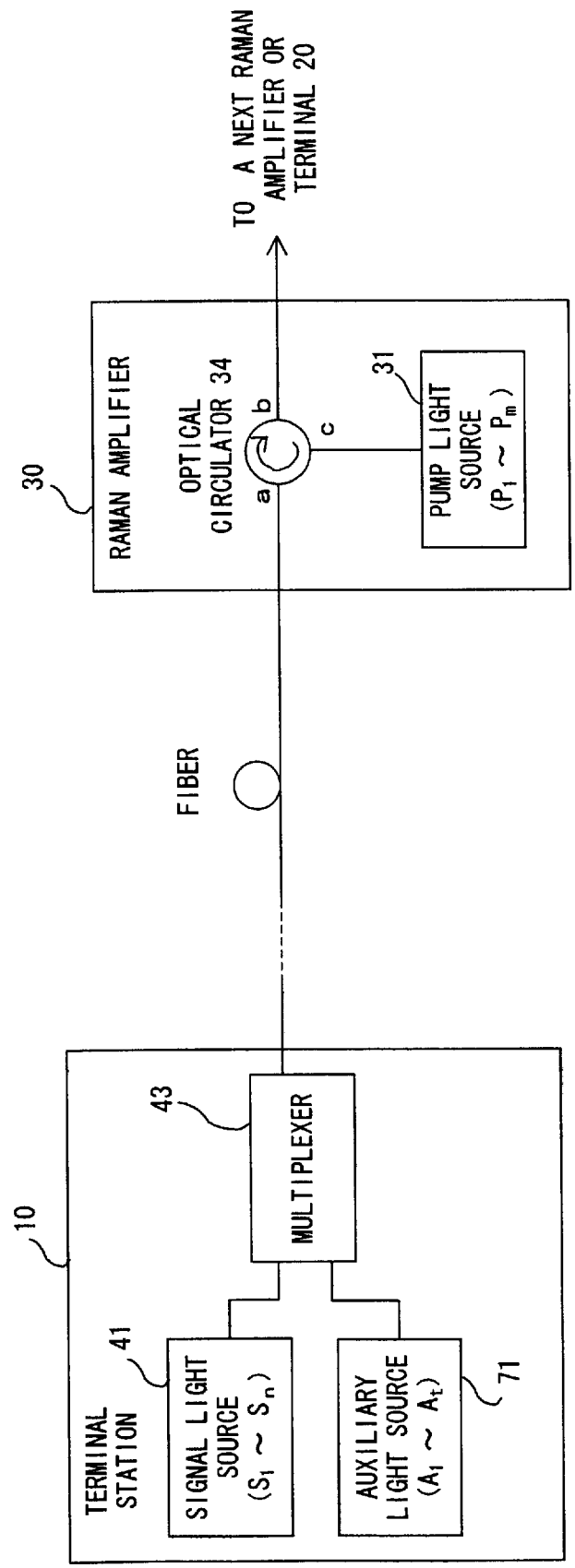
Figure 26:
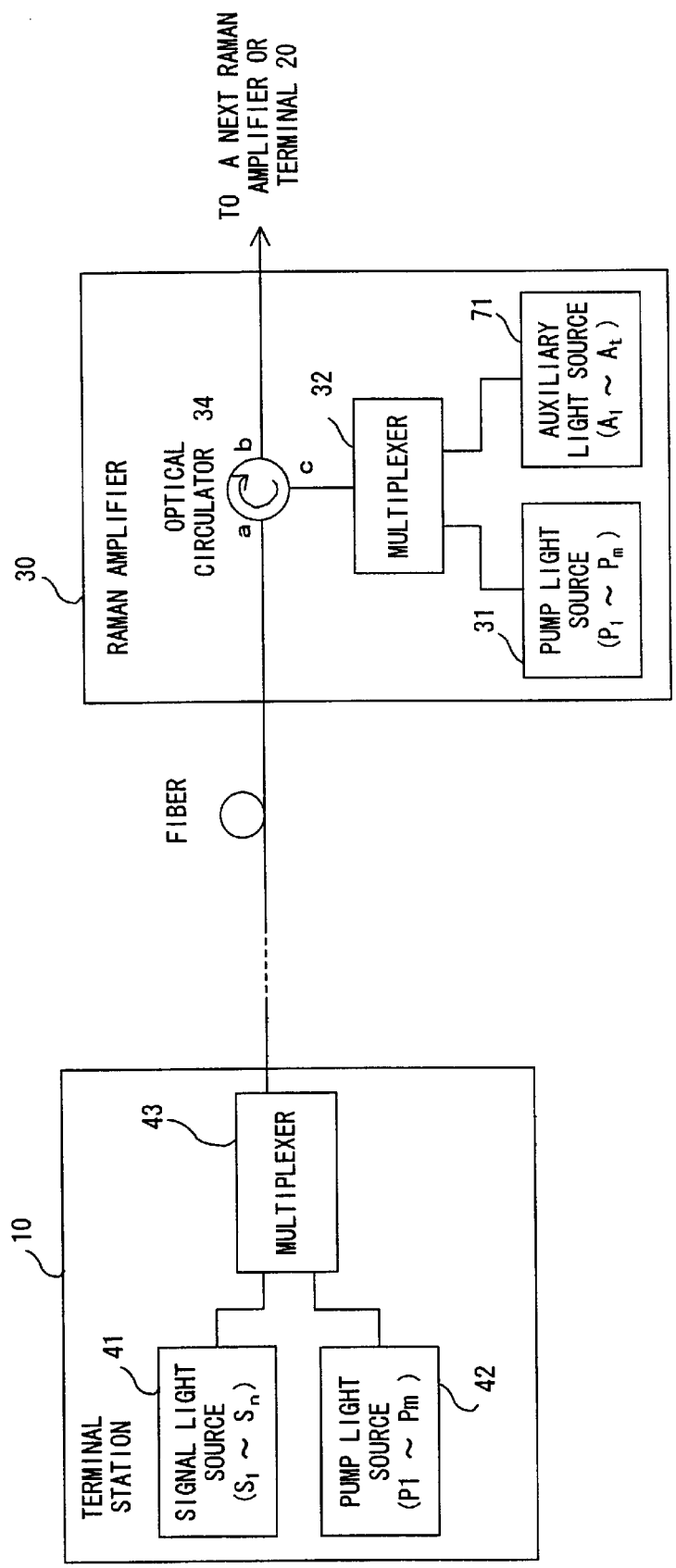
Figure 27:
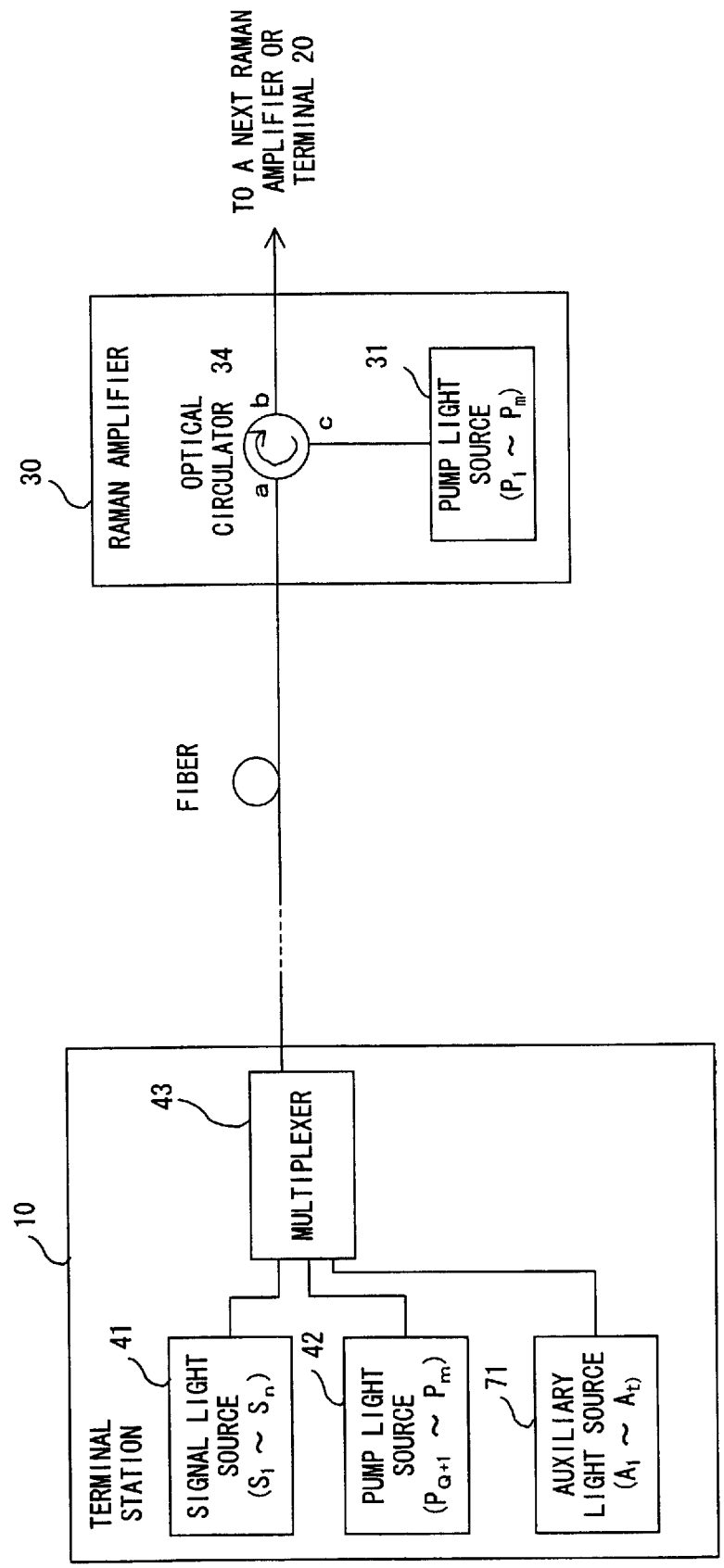

The auxiliary lights A1 through At is also applicable to a system where three or more stages of Raman amplification are performed. FIG. 23 shows the case where the auxiliary lights A1 through At are used in a system where three stages of Raman amplification are performed.

The auxiliary lights A1 through At can be generated by the terminal station 10 or each Raman amplifier 30. FIGS. 24 through 27 show examples of the system in which auxiliary light source is provided to generate the auxiliary lights A1 through At. In the examples shown in FIGS. 24 and 26, auxiliary light source 71 for generating the auxiliary lights A1 through At is provided in each Raman amplifier 30. In this case, the auxiliary lights A1 through At are supplied to a transmission line optical fiber together with the pump lights P1 through Pm. However, in the examples shown in FIGS. 25 and 27, auxiliary light source 71 for generating the auxiliary lights A1 through At is provided in the terminal station 10. In this case, the auxiliary lights A1 through At are multiplexed by wavelength-division and are transmitted to a transmission line together with the signal lights S1 through Sn.

The auxiliary lights A1 through At can be located based on the ITU-T grid, shown in FIG. 11A, like signal light or pump light. Alternatively, the auxiliary lights A1 through At can be located at specific frequency intervals like pump light.

Furthermore, the auxiliary lights A1 through At can be used for carrier waves for transmitting supervisory signals used for the terminal station 10 or 20 to check the state of each Raman amplifier or a transmission line. However, in this case, the auxiliary lights A1 through At must be basically generated by a terminal station. The supervisory signals can be transmitted using the pump light P1 through Pm.

Furthermore, the optical power of the auxiliary lights A1 through At can be adjusted by an instruction from the terminal station 10 or 20. In this case, the optical powers of the auxiliary light A1 through At are adjusted in such a way that the gain of a wavelength band where signal light is located is equalized. Specifically, for example, the optical power of the auxiliary lights A1 through At are adjusted based on whether the gain of the longer wavelength area in a wavelength band where signal lights are located is relatively high.

Figure 28:
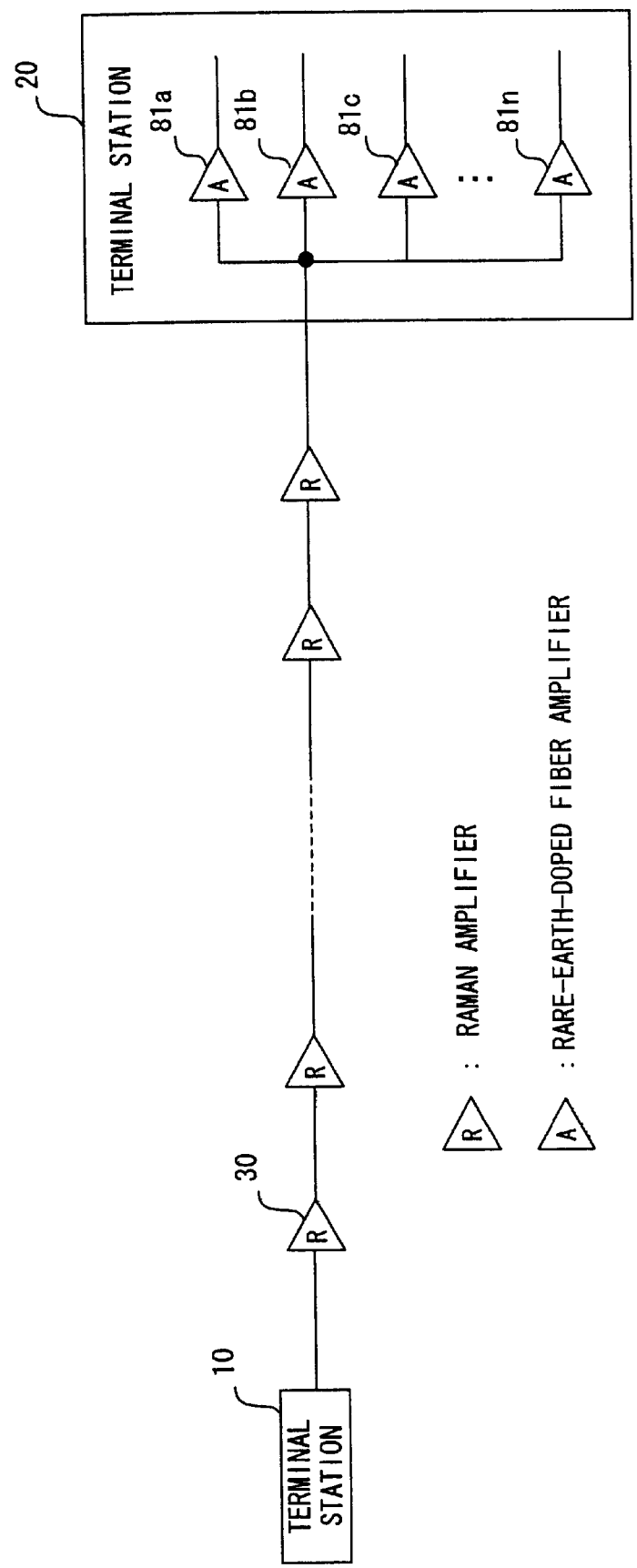
FIG. 28 shows the configuration of an optical transmission system in which a Raman amplifier and a rare-earth-doped fiber amplifier coexist.

FIG. 28 shows the configuration of an optical transmission system of the present invention. In this system, a plurality of Raman amplifiers 30 are installed on a transmission line and an optical amplifier using rare-earth-doped fibers (hereinafter called "rare-earth-doped fiber amplifier") is installed within the terminal station. It is assumed that in this system, signal light is transmitted in a wavelength band of 100 nm or more using the Raman amplifier described above. The terminal station 10 is also provided with a rare-earth doped fiber amplifier, which is not shown in FIG. 28.

It is well known that the gain wavelength band of a rare-earth-doped fiber amplifier varies depending on a substance doped into an optical fiber. However, the bandwidth of an effective gain of a rare-earth-doped fiber amplifier is usually approximately 30 to 40 nm. Therefore, a plurality of rare-earth-doped fiber amplifiers with different gain wavelength bands must be used to amplify multi-wavelength light with a wavelength band of 100 nm or more. In the example shown in FIG. 28, a plurality of rare-earth-doped fiber amplifiers 81a through 81n with different gain wavelength bands are provided in the terminal station. Multi-wavelength light is demultiplexed for each gain wavelength band of the respective rare-earth-doped fiber amplifiers by a demultiplexer, which is not shown in FIG. 28, in the terminal station 20, and each of demultiplexed lights is amplified by a corresponding rare-earth-doped fiber amplifiers 81a through 81n. A method for effectively locating pump light for Raman amplification in an optical transmission system where both Raman amplifier and rare-earth-doped amplifier are used is described below.

In the system of this embodiment, a plurality of pump lights are located in such a way that the following equation (1) is satisfied. In the equation, "Δfr" is Raman shift frequency, "Δfe" is an frequency interval for locating a plurality of pump light, and "n" is an arbitrary integer.

$$\Delta fr = n \cdot \Delta fe \quad (1)$$

FIG. 29A is a table for showing frequency interval and wavelength interval obtained when "n=1 through 6" are assigned to equation (1). Here, the Raman shift frequency (Δfr) is 13.2 THz. In this case, "1" through "6" are assigned as "n", "13.2 THz" to "2.2 THz" are obtained as intervals (Δfe) used to locate a plurality of pump light, respectively. If these intervals are converted into frequencies at wavelength of 1550 nm, "105.7 nm" to "17.6 nm" are obtained, respectively. Here, thr gain bandwidth of each of rare-earth-doped fiber amplifier is 30–40 nm. Therefore, to minimize the number of rare-earth-doped fiber amplifiers 81a through 81n, "3" is optimal as "n" to be assigned to equation (1).

Figure 30:
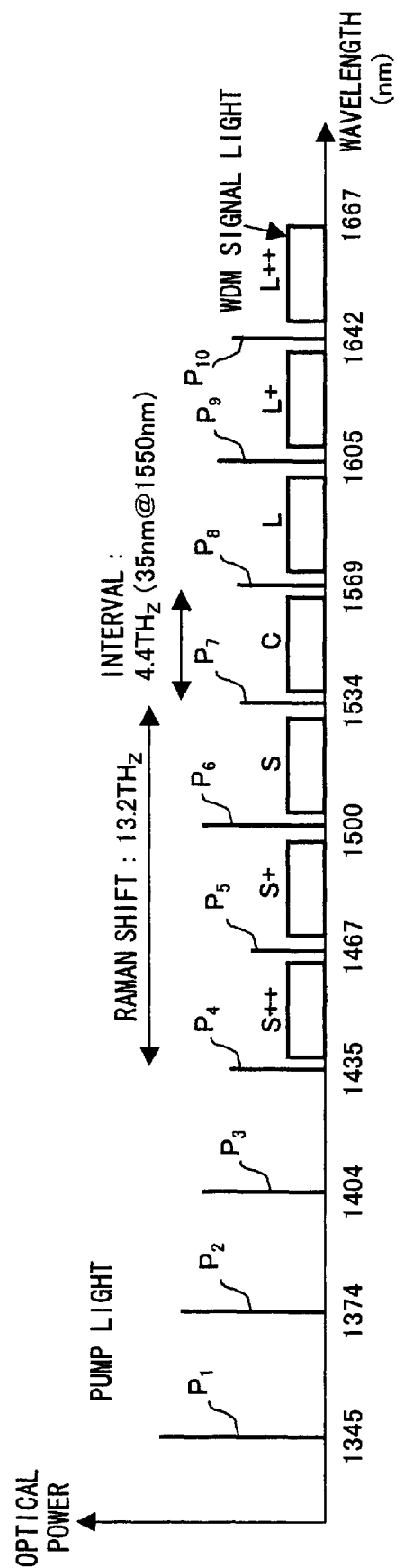
FIG. 30 and FIG. 31 show examples of the location of pump light.

FIG. 30 shows one example where a plurality of pump lights are located according to equation (1). In this example, "n=3" is assigned to equation (1). Specifically, a plurality of pump lights P1 through P10 are located at intervals of 4.4 THz.

In this example, a wavelength band where a plurality of signal lights are located is 1435–1667 nm. In a transmission line, each Raman amplifier using the pump lights P1 through P10 collectively amplifies the entire signal light wavelength band. However, in a terminal station, this signal light wavelength band is amplified by a plurality of rare-earth-doped fiber amplifiers 81*a* through 81*n*. Specifically, this signal light wavelength band is demultiplexed into seven wavelength bands (S++ band, S+ band, S band, C band, L band, L+ band and L++ band) and each demultiplexed wavelength band is amplified by a corresponding rare-earth-doped fiber amplifiers 81*a* through 81*n*. In this example, "S++ band" through "L++ band" correspond to wavelength bands (or frequency band) separated by the pump lights P4 through P10, respectively. That is, each of the bandwidth of "S++ band" through "L++ band" is 4.4 THz (approximately 30 to 40 nm), respectively. Therefore, each of the rare-earth-doped fiber amplifiers 81*a* through 81*n* can amplify a corresponding one of "S++ band" through "L++ band". Specifically, for example, the rare-earth-doped fiber amplifier 81*a* amplifies a wavelength band 1435–1467 nm, and the rare-earth-doped fiber amplifier 81*b* amplifies a wavelength band 1467–1500 nm.

According to equation (1), a plurality of pump lights are located in such a way that a peak wavelength of Raman gain due to one pump light may match the wavelength of another one of pump lights. For example, a wavelength in which Raman gain due to pump light P1 has a peak matches the wavelength of pump light P4, and a wavelength in which Raman gain due to pump light P2 has a peak matches the wavelength of pump light P5. Therefore, it is expected that work for adjusting the optical power of each pump light in order to equalize Raman gain (pre-emphasis) is simple.

In the system of another embodiment, a plurality of pump lights are located in such away that the following equation (2) is satisfied. In the equation, "Δfr" is Raman shift frequency, "Δfe" is an frequency interval for locating a plurality of pump light, and "n" is an arbitrary integer.

$$\Delta fr = (n+0.5) \cdot \Delta fe \quad (2)$$

FIG. 29B is a table for showing feequency interval and wavelength interval obtained when "n=1 through 6" are assigned to equation (2). As shown in FIG. 29B, if "1" through "6" are assigned as "n", "8.8 THz" to "2.0 THz" are obtained as intervals (Δfe) used to locate a plurality of pump lights, respectively. If these intervals are converted into frequencies at wavelength 1550 nm, "70.5 nm" to "16.3 nm" are obtained, respectively. Taking into consideration that the gain bandwidth of a rare-earth-doped fiber amplifier is 30 to 40 nm, "2" or "3" are optimal as "n" to be assigned to equation (2).

Figure 31:
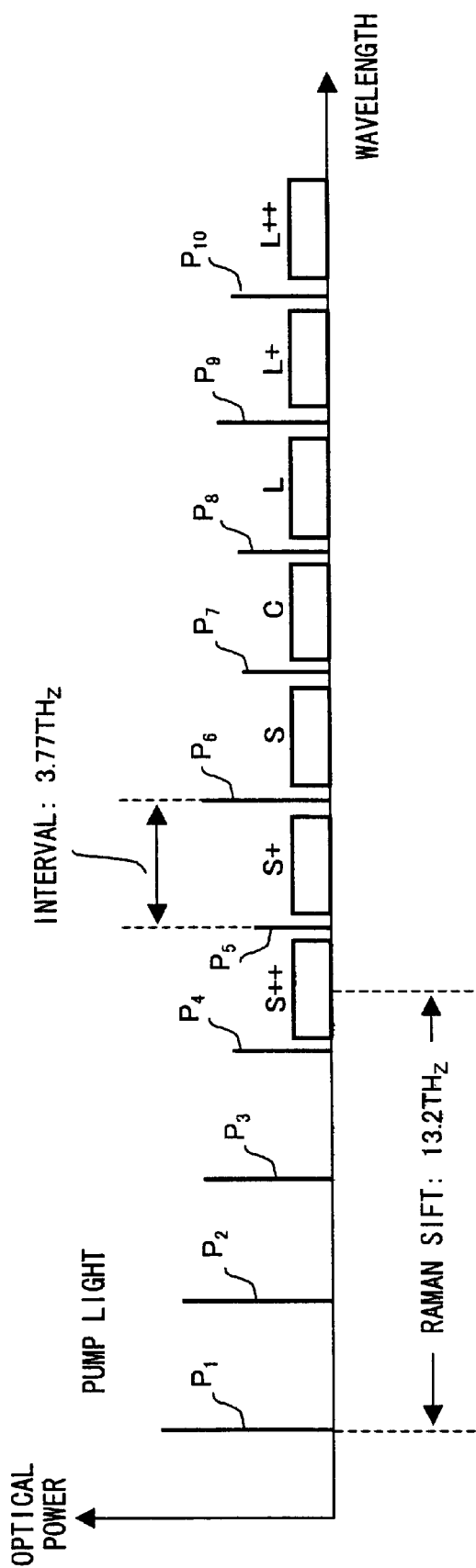
Figure 32:
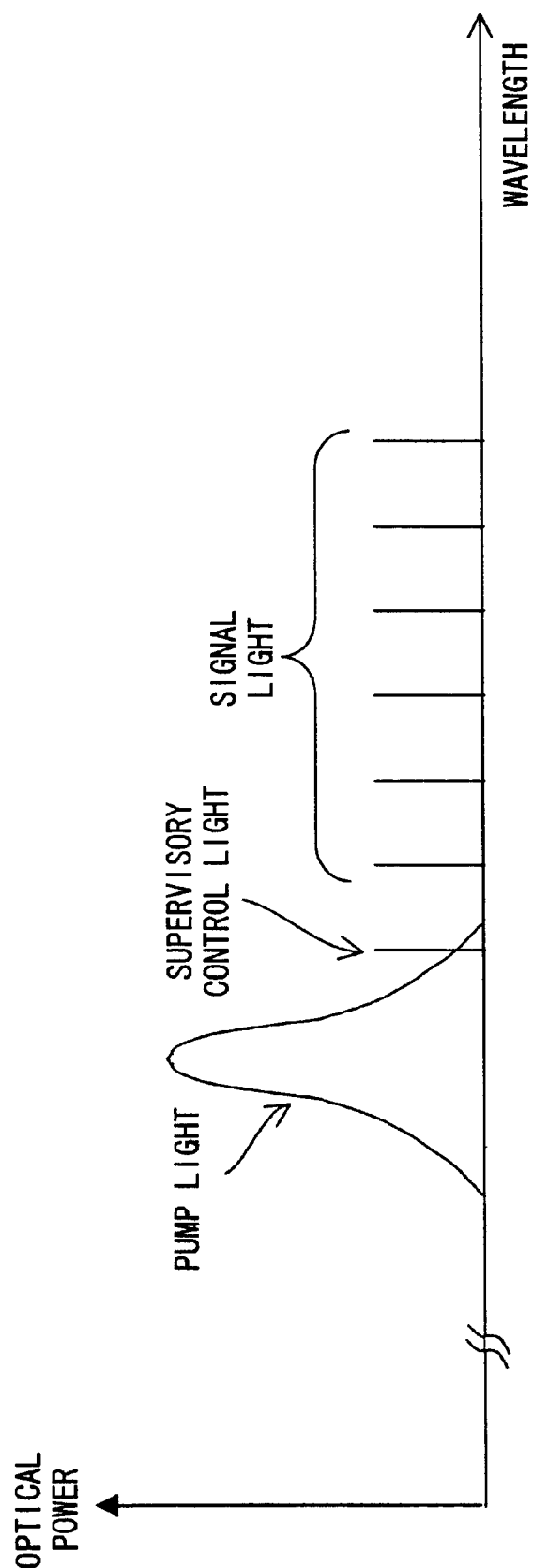
FIG. 32 shows how to locate supervisory control light.

FIG. 31 shows an example where a plurality of pump lights are located based on equation (2). FIG. 31 shows the case where "n=3" is assigned to equation (2). Specifically, the pump lights P1 through P10 are located at intervals of 3.77 THz. In this example too, as in the method shown in FIG. 30, a signal light wavelength band is demultiplexed into a plurality of wavelength bands (S++ band to L++ band) and each demultiplexed band is amplified by a corresponding rare-earth-doped fiber amplifiers 81*a* through 81*n*.

According to equation (2), the peak wavelength of Raman gain due to a particular pump light is an almost intermediate between a wavelength of n-th pump light from the particular pump light and a wavelength of (n+1)-th pump light from the particular pump light. For example, a wavelength at which Raman gain due to pump light P1 has a peak is an almost intermediate between the wavelength of pump light P4 and the wavelength of pump light P5. In this example, each of the wavelength bands (S++ bans to L++ band) separated by the pump lights P4 through P10 is amplified by corresponding rare-earth-doped fiber amplifiers 81*a* through 81*n*. Therefore, the peak frequency of Raman gain due to each of the pump lights is located almost at the center of the gain wavelength band of corresponding rare-earth-doped fiber amplifiers 81*a* through 81*n*. Therefore, a stable operation can be expected.

A method in which the terminal station 10 or 20 locates supervisory control light used to transmit a supervisory signal for checking the state of each Raman amplifier or a transmission line is described.

Supervisory control light is a carrier wave for transmitting a supervisory signal in order to monitor a transmission system. The transmission rate of the supervisory signal is much lower than a signal to be transmitted by signal light. For example, the transmission rate of a signal to be transmitted by signal light is approximately 10 Gbps, while the transmission rate of a supervisory signal is, for example, 10 kbps to several Mbps. Therefore, supervisory control light can be received even if the optical S/N ratio is bad compared with signal light.

However, the optical power of pump light is sufficiently high compared with the optical power of signal light. Therefore, the optical spectrum of the pump light is fairly wide, and disturbance (crosstalk, four-optical-wave mixture and the like) is large in the vicinity of the pump light. In other words, optical S/N ratio is deteriorated in the vicinity of pump light. Therefore, in the system of this embodiment, supervisory control light, which can be detected even under bad optical S/N ratio circumstance, is located in the vicinity of pump light. Thus, supervisory control light uses no wavelength band away from pump light and signal light can be efficiently located accordingly.

According to the present invention, a gain bandwidth wider than Raman shift amount can be obtained using a Raman amplifier, and a large-capacity WDM transmission system can be implemented accordingly. Since auxiliary light is located at a wavelength which is longer than that of signal light in order to absorb the energy of signal light, the signal light can be prevented from being amplified too much. Furthermore, since a rare-earth-doped fiber amplifier to be used is determined in relation to the location of pump light for Raman amplification, a Raman amplifier and a rare-earth-doped fiber amplifier can be easily used together.

What is claimed is:

1. A Raman amplifier for amplifying multi-wavelength light including a plurality of signal lights, comprising:

a transmission medium transmitting the multi-wavelength light and a first pump light for amplifying the multi-wavelength light where the multi-wavelength light and the first pump light propagate in an identical direction;

a light source generating a second pump light for amplifying the multi-wavelength light; and an optical device guiding the second pump light generated by said light source to the transmission medium, wherein at least one of the first pump light and the second pump light is located within a band of the multi-wavelength light.

2. A Raman amplifier for amplifying multi-wavelength light including a plurality of signal lights, comprising:

a transmission medium transmitting the multi-wavelength light;

a light source generating first pump light located within a band of the multi-wavelength a light and second pump light located out of a band of the multi-wavelength light; and an optical device guiding the first pump light and the second pump light generated by said light source to the transmission medium wherein the first pump light is located based on the ITU-T grid.

3. The Raman amplifier according to claim 1, wherein a wavelength of the second pump light is shorter than a wavelength of the multi-wavelength light.

4. The Raman amplifier according to claim 1, wherein the first pump light and the second pump light are located at equal frequency intervals.

5. The Raman amplifier according to claim 1, wherein the first pump light is located based on the ITU-T grid.

6. The Raman amplifier according to claim 1, wherein each of the first pump light and the second pump light is composed of two or more optical waves.

7. The Raman amplifier according to claim 1, wherein the first pump light is amplified by the second pump light.

8. A Raman amplifier for amplifying multi-wavelength light including a plurality of signal lights, comprising:
- a transmission medium transmitting the multi-wavelength light and first pump light where the multi-wavelength light and the first pump light propagate in an identical direction;
- a light source generating second pump light located within a band of the multi-wavelength light and third pump light located out of a band of the multi-wavelength light; and
- an optical device guiding the second pump light and the third pump light generated by said light source to the transmission medium.

9. An optical transmission system in which a Raman amplifier is installed between a first terminal station and a second terminal station, and multi-wavelength light including a plurality of signal lights is transmitted from the first terminal station to the second terminal station, wherein the first terminal station comprises:
- a signal light source generating the multi-wavelength light; and
- a first pump light source generating first pump light, and the Raman amplifier comprises:
- a transmission medium transmitting the multi-wavelength light and the first pump light;
- a second pump light source generating second pump light; and
- an optical device guiding the second pump light generated by said second pump light source to the transmission medium, wherein at least a part of the first pump light is located within a band of the multi-wavelength light, and wherein optical power of the first pump light and the second pump light are adjusted in such a way that gain of the Raman amplifier is equalized.

10. An optical transmission system in which a Raman amplifier is installed between a first terminal station and a second terminal station, and multi-wavelength light including a plurality of signal lights is transmitted from the first terminal station to the second terminal station, wherein the first terminal station comprises:
- a signal light source generating the multi-wavelength light, and the Raman amplifier comprises:
- a transmission medium transmitting the multi-wavelength light;
- a first pump light source generating first pump light located within a band of the multi-wavelength light;
- a second pump light source generating second pump light located out of a band of the multi-wavelength light; and
- an optical device guiding the first pump light generated by said first pump light source and the second pump light generated by said second pump light source to the transmission medium, wherein optical power of the first pump light and the second pump light are adjusted in such a way that gain of the Raman amplifier is equalized.

11. The optical transmission system according to claim 9, wherein optical power of the first pump light and the second pump light are adjusted according to an instruction from the first or second terminal station.

12. The optical transmission system according to claim 9, wherein power of the signal light is adjusted based on an optical S/N ratio of each of the signal light detected by the second terminal station.

13. A Raman amplifier for amplifying multi-wavelength light including a plurality of signal lights, comprising:
- a transmission medium transmitting the multi-wavelength light and auxiliary light with a longer wavelength than a wavelength of the multi-wavelength light;
- a light source generating pump light for amplifying the multi-wavelength light; and
- an optical device guiding the pump light generated by said light source to the transmission line.

14. A Raman amplifier for amplifying multi-wavelength light including a plurality of signal lights, comprising:
- a transmission medium transmitting the multi-wavelength light;
- a light source generating pump light for amplifying the multi-wavelength light and auxiliary light with a longer wavelength than a wavelength of the multi-wavelength light; and
- an optical device guiding the pump light and auxiliary light generated by said light source to the transmission medium.

15. The Raman amplifier according to claim 13, wherein a plurality of auxiliary lights are located at equal frequency intervals.

16. The Raman amplifier according to claim 13, wherein the auxiliary light is located based on the ITU-T grid.

17. The Raman amplifier according to claim 13, wherein the auxiliary light includes two or more optical waves.

18. The Raman amplifier according to claim 13, wherein the auxiliary light is located so as to absorb energy of a part of the plurality of signal light.

19. An optical transmission system in which a Raman amplifier is installed between a first terminal station and a second terminal station, and multi-wavelength light including a plurality of signal lights is transmitted from the first terminal station to the second terminal station, wherein the first terminal station comprises:
- a signal light source generating the multi-wavelength light; and
- an auxiliary light source generating auxiliary light with a longer wavelength than a wavelength of the multi-wavelength light, and the Raman amplifier comprises:
- a transmission medium transmitting the multi-wavelength light and the auxiliary light;
- a pump light source generating pump light for amplifying the multi-wavelength light; and
- an optical device guiding the pump light generated by said pump light source to the transmission medium, wherein optical power of the auxiliary light is adjusted in such a way that a gain of the Raman amplifier is equalized.

20. An optical transmission system in which a Raman amplifier is installed between a first terminal station and a second terminal station, and multi-wavelength light including a plurality of signal lights is transmitted from the first terminal station to the second terminal station, wherein the first terminal station comprises:
a signal light source generating the multi-wavelength light, and the Raman amplifier comprises:
a transmission medium transmitting the multi-wavelength light;
a pump light source generating pump light for amplifying the multi-wavelength light;
an auxiliary light source generating auxiliary light with a longer wavelength than a wavelength of the multi-wavelength light; and
an optical device guiding the pump light generated by said pump light source and the auxiliary light generated by said auxiliary light source to the transmission medium, wherein
optical power of the auxiliary light is adjusted in such a way that a gains of the Raman amplifier is equalized.

21. The optical transmission system according to claim 19, wherein
optical power of the auxiliary light is adjusted by an instruction from the first or second terminal station.

22. The optical transmission system according to claim 19, wherein
a supervisory signal for monitoring a state of this transmission system is carried by the auxiliary light.

23. An optical transmission system in which multi-wavelength light including a plurality of signal lights is amplified by a Raman amplifier, wherein
the Raman amplifier amplifies the multi-wavelength light using a plurality of pump lights located at frequency intervals of 1/n of Raman shift amount (n is an integer).

24. An optical transmission system in which multi-wavelength light including a plurality of signal lights is amplified by a Raman amplifier and a rare-earth doped fiber amplifier, wherein
the Raman amplifier amplifies the multi-wavelength light using a plurality of pump lights located at frequency intervals of 1/n of Raman shift amount, and wherein
the rare-earth-doped fiber amplifier is composed of a plurality of amplification units corresponding to the plurality of pump lights, and each amplification unit amplifies signal light in a corresponding wavelength band (n is an integer).

25. An optical transmission system in which multi-wavelength light including a plurality of signal lights is amplified by a Raman amplifier and a rare-earth doped fiber amplifier, wherein
the Raman amplifier amplifies the multi-wavelength light using a plurality of pump lights located at frequency intervals of $1/(n+0.5)$ of Raman shift amount, and wherein
the rare-earth-doped fiber amplifier is composed of a plurality of amplification units corresponding to the plurality of pump lights, and each amplification unit amplifies signal light in a corresponding wavelength band (n is an integer).

26. An optical transmission system in which multi-wavelength light including a plurality of signal lights is amplified by a Raman amplifier, wherein
the Raman amplifier amplifies the multi-wavelength light using pump light located within a band of the multi-wavelength light, and wherein
a supervisory signal for monitoring a state of this transmission system is located in a vicinity of pump light which is located within a band of the multi-wavelength light and wherein a transmission rate of the supervisory signal is much lower than that of signals transmitted by the multi-wavelength light.

* * * * *